(12) United States Patent
Pellenc et al.

(10) Patent No.: US 10,945,424 B2
(45) Date of Patent: Mar. 16, 2021

(54) COMPACT SPRAYING MODULE, SYSTEM FOR SPRAYING AND CONTROLLING A PLURALITY OF SUCH MODULES, AND METHOD FOR CONTROLLING MODULES OF SUCH A SYSTEM

(71) Applicant: PELLENC (SOCIETE ANONYME), Pertuis (FR)

(72) Inventors: Roger Pellenc, Pertuis (FR); Jean-Marc Gialis, Cheval Blanc (FR)

(73) Assignee: PELLENC (SOCIETE ANONYME), Pertuis (FR)

(*) Notice: Subject to any disclaimer, the term of this patent is extended or adjusted under 35 U.S.C. 154(b) by 233 days.

(21) Appl. No.: 15/739,204

(22) PCT Filed: Jun. 23, 2016

(86) PCT No.: PCT/FR2016/051548
§ 371 (c)(1),
(2) Date: Dec. 22, 2017

(87) PCT Pub. No.: WO2016/207559
PCT Pub. Date: Dec. 29, 2016

(65) Prior Publication Data
US 2018/0168140 A1 Jun. 21, 2018

(30) Foreign Application Priority Data
Jun. 25, 2015 (FR) ...................................... 1555895

(51) Int. Cl.
*A01M 7/00* (2006.01)
*B05B 3/10* (2006.01)
(Continued)

(52) U.S. Cl.
CPC ........ *A01M 7/0014* (2013.01); *A01M 7/0089* (2013.01); *B05B 3/105* (2013.01);
(Continued)

(58) Field of Classification Search
CPC .............. A01M 7/0014; A01M 7/0028; A01M 7/0089; B05B 3/10–1092; B05B 7/0081;
(Continued)

(56) References Cited

U.S. PATENT DOCUMENTS 4,270,698 A * 6/1981 Bisa .................... B01F 3/04007
239/171
4,473,188 A 9/1984 Ballu
(Continued)

FOREIGN PATENT DOCUMENTS

DE 28 23 253 A1 5/1979
FR 1 454 562 A 2/1966
(Continued)

OTHER PUBLICATIONS

International Search Report, dated Sep. 29, 2016, from corresponding PCT application No. PCT/FR2016/051548.

*Primary Examiner* — Cody J Lieuwen
(74) *Attorney, Agent, or Firm* — IPSilon USA, LLP

(57) ABSTRACT

Disclosed is a compact spraying module for spraying a liquid in the form of droplets for treating a target. The module includes a spraying unit including a nozzle containing at least one spraying member and a fan that is capable of generating a carrying air flow in the nozzle and of carrying the droplets originating from the member to the target. The module includes its own liquid supply system that and includes an electric pump, an electronic control and monitoring unit, a holder that keeps the pump near the spraying unit, an individual communication interface, and a power supply interface. Also disclosed is a system for spraying and controlling a plurality of such modules and to a method for controlling modules of such a system.

22 Claims, 13 Drawing Sheets

Figure 1:
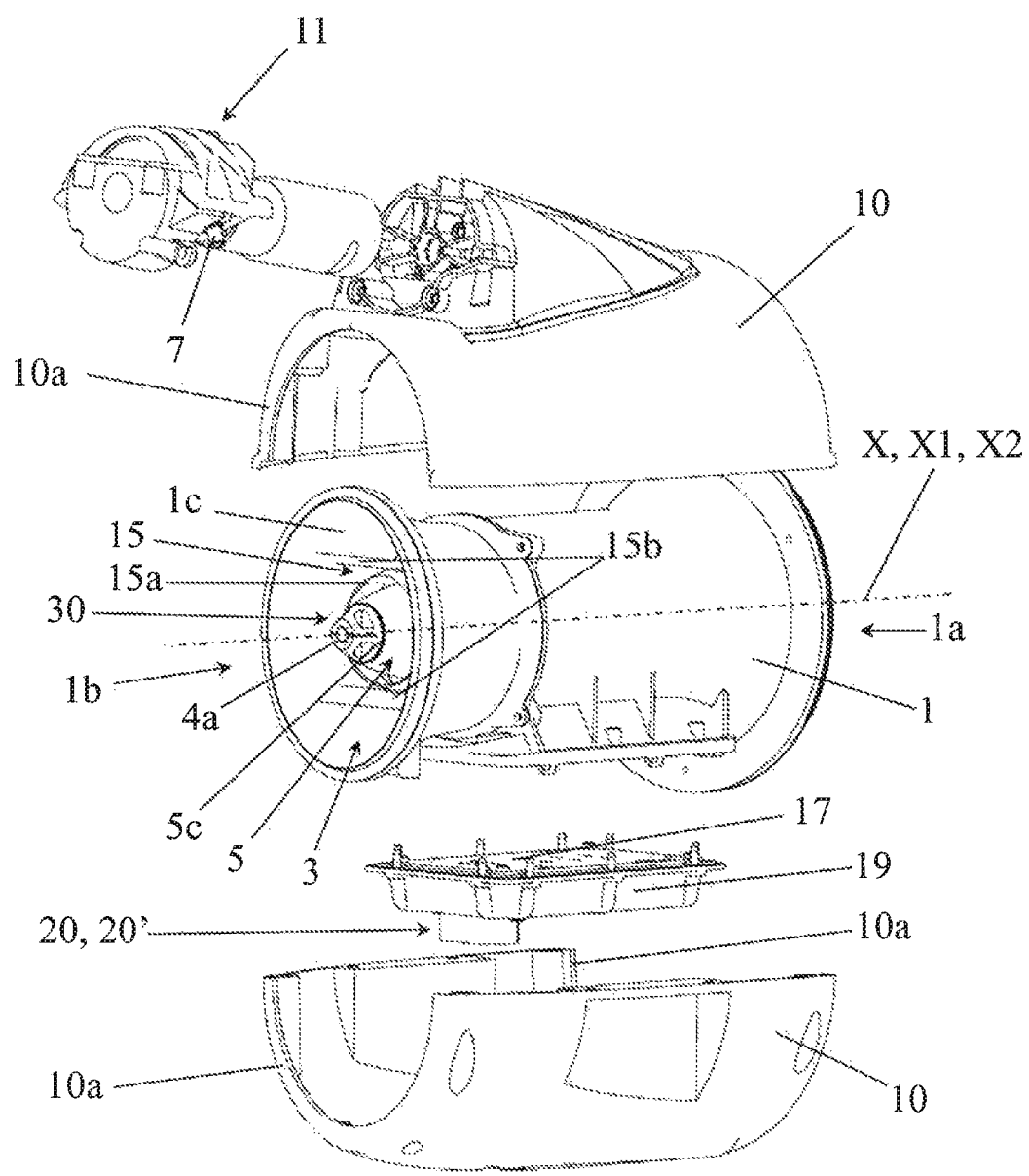

(51) Int. Cl.
  *B05B 7/00* (2006.01)
  *B05B 7/04* (2006.01)
  *B05B 7/08* (2006.01)

(52) U.S. Cl.
  CPC .......... *B05B 3/1014* (2013.01); *B05B 7/0081* (2013.01); *B05B 7/0458* (2013.01); *B05B 7/0466* (2013.01); *B05B 7/0475* (2013.01); *B05B 7/0815* (2013.01)

(58) Field of Classification Search
  CPC ... B05B 7/0458; B05B 7/0466; B05B 7/0475; B05B 7/0815; B05B 7/0825
  See application file for complete search history.

(56) References Cited

U.S. PATENT DOCUMENTS

| | | | | |
|---|---|---|---|---|
| 4,609,145 A * | 9/1986 | Miller | ................ | A01M 7/0014 239/159 |
| 4,795,095 A * | 1/1989 | Shepard | ................ | B05B 3/105 239/214.17 |
| 5,224,651 A * | 7/1993 | Stahl | ................ | A61L 2/22 239/102.2 |
| 5,278,423 A | 1/1994 | Wangler et al. | | |
| 6,152,382 A * | 11/2000 | Pun | ................ | A01M 7/0014 239/11 |
| 6,443,365 B1 * | 9/2002 | Tucker | ................ | A01M 7/0089 239/155 |
| 2002/0100815 A1 * | 8/2002 | Doebler | ................ | A01M 7/0003 239/67 |
| 2011/0089258 A1 * | 4/2011 | Pun | ................ | B05B 3/10 239/214.23 |
| 2015/0258555 A1 * | 9/2015 | Peterson | ................ | A01M 7/006 239/7 |
| 2016/0121356 A1 | 5/2016 | Ballu | | |
| 2016/0310978 A1 * | 10/2016 | Bittner | ................ | B05B 12/002 |
| 2016/0332174 A1 * | 11/2016 | Leslie | ................ | A61D 1/025 |

FOREIGN PATENT DOCUMENTS

| | | |
|---|---|---|
| FR | 2 497 439 A1 | 7/1982 |
| FR | 3 005 877 A1 | 11/2014 |
| WO | 2014/188110 A1 | 11/2014 |

\* cited by examiner

COMPACT SPRAYING MODULE, SYSTEM FOR SPRAYING AND CONTROLLING A PLURALITY OF SUCH MODULES, AND METHOD FOR CONTROLLING MODULES OF SUCH A SYSTEM

The invention relates to the field of devices that project a liquid in the form of droplets mixed with a stream of carrier air onto a target that consists of, for example, a plant mat, and it has as its object a compact spraying module. It also has as its object a system for spraying and controlling a number of such modules and a method for controlling the modules of such a system.

It can be applied in particular in the agricultural field for the treatment of field crops, tree farming, or wine-making. It will be described below for the sake of simplification in its application in the wine-making sector, requiring significant supplies of phytosanitary products. The supply of the latter in nature can generate over the more or less long term serious consequences on the health plane as on the ecological plane but also on the economic plane. These products are actually one of the primary sources of pollution of water, soil, and groundwater tables, and their inhalation and even their ingestion has irreversible consequences on the users' health. On the economic plane, apart from the high cost of products and their implementation, the ineffectiveness of a treatment can cause irreversible damage to the harvest.

In this context, over the past few years, public authorities have made the standards more stringent on treatment devices, imposing, for example in France, an obligatory technical monitoring of spraying devices every 5 years. Along another avenue, active materials identified as being the most dangerous are forbidden or their approved dose is reduced. It is clear that these standards will evolve continuously in the future and will therefore become even more stringent with regard to the regulatory situation of the machines and products. This evolution requires the design of new spraying machines making it possible to make judicious use of minimum doses of active material directed toward a specified plant target while limiting their energy consumption for preserving at the same time the environment, the health of the plants in question, but also that of the operators having to control such machines.

Known are multiple types of sprayers used in the wine-making industry for cover treatments or focused on the area of bunches of grapes, and in particular the following four types of sprayers: spray-jet, air-assisted, pneumatic and centrifugal.

All of these devices have in common projection onto the crushed vegetation (term used to define the liquid to be projected, generally consisting of a mixture of water and active material) that is transported in liquid form and under pressure in piping that ends in a spray nozzle. The pulp is micronized in droplets in the area of the nozzle and directed toward the vegetation by different means according to the technology of the spraying device. The nozzle comprises a calibrated jet, most often consisting of the opening formed in a small plate of slight thickness, this opening passing through the small plate that can have varied shapes (cylinder, prism, cone, . . . ) but of small size to be able to transform the pressurized liquid upstream into droplets downstream. The jet defines the flow rate of pulp that will be sprayed and the droplet size. This flow rate of pulp is not, however, controlled precisely because of depending in particular on the pressure conditions of the liquid upstream, different for each nozzle, because of being based on geometry and the length of piping between the pump and the nozzle, and the wear and tear over time on the jet due to the abrasion of its opening with passage of the products.

In the spray jet devices, in a general way comprising a number of nozzles for covering the zone to be sprayed, the pulp is transformed into droplets in the area of each nozzle by the combined effect of the pressure of the liquid upstream from the jet and the geometry of the jet, with this effect also communicating to said droplets a kinetic energy and a direction of their spraying. The droplets are thus projected directly into the ambient air generally in the form of a cone for spreading at a more or less large angle, depending also on the shape of the jet and the pressure of the pulp upstream from the latter. In contrast, the higher the pressure of the pulp, the higher the speed the droplets formed at the outlet of the jet will have, but then the smaller size they will be, limiting their kinetic energy and therefore their capacity to reach the leaves and the grapes, by adding the fact of their evaporation between the outlet of the nozzle and the targeted vegetation. The droplets can also be subjected to a significant drift from their path in the event of wind. It is also known in this type of device that a great variation in pressure generates only a small variation in flow rate, while making the droplet size vary significantly. This type of device then defines optimum operation between the pressure and the jet in the area of each nozzle that only allows little or no adjustment in the flow rate of pulp for spraying the targeted vegetation, i.e., the flow rate is not controlled upstream from the jet. The change in flow rate of pulp projected at the vegetation then makes it necessary to change all of the nozzles (or their jets) by human intervention that is long and labor-intensive and that requires that safety equipment be worn.

In the air-assisted devices, the pulp is always transported under pressure in the area of the nozzle with an effect similar to the spray jet devices. In this technology, however, a high-speed air stream (high flow rate of air at speeds on the order of 100 to 200 km/h) will surround the nozzle to carry the droplets to the vegetation, heightening the speed of the droplets to the targeted vegetation and promoting their penetration. This air stream is provided by a centralized ventilation system on the machine and will then be piped to each spray nozzle. Thus, with an air-assisted device, the droplet size is always determined by the combination of the pressure and the jet, but it is essentially the air stream in the area of the jet that will transport the droplets on a path that is oriented toward the targeted vegetation, by greatly reducing the sensitivity of said path to the influence of outside wind and by limiting the evaporation of the droplets during their travel.

However, in line with the spray jet technology, the flow rate in the area of each nozzle is given only by way of indication, is not controlled, differs from one nozzle to the next, and can vary only over a small flow rate range, requiring that the nozzles (or their jets) be changed to modify the flow rate of pulp to be sprayed. In addition, the air that is necessary to the composition of the air stream is generated in a centralized way and then distributed to the various nozzles through a circuit of long and complex piping generating significant losses of feedstock, air speeds that are different and not controlled from one nozzle to the next, as well as an overabundant energy consumption. The high-power turbines used here are in addition particularly noisy.

In contrast to air-assisted or spray-jet devices, the pneumatic devices form the droplets directly from an accelerated high-speed air stream in the area of the nozzle (generally from 300 to 500 km/h), called a spark gap here (often a simple jet). The pulp is brought under pressure into the area of the spark gap to form a vein of non-micronized liquid in the absence of the air stream. The high-speed air stream is accelerated in the area of the spark gap (for example, by Venturi effect) to generate the micronization of the liquid vein into droplets. The droplet size in such devices is linked to the speed of the air stream in close relation with the flow rate of the pulp in the area of the spark gap. A change in air speed is then always to accompany a change in flow rate and in a general way the jet of the spark gap, so as not to penalize the spraying quality. And conversely, a change in jet to modify the flow rate will also necessitate adapting the speed of the air stream. There also, the operating principle of these devices generates, like the technologies mentioned above, flow rates and air speeds that differ from one nozzle to the next resulting in the spraying in the area of the targeted vegetation, with a pulp flow rate that is given by way of indication and is not controlled. The generation of the air stream is also centralized there, a heavy consumer of energy and particularly noisy.

The major drawbacks of these first 3 technologies can be summarized as follows:

- The spraying parameters, such as, for example, the flow rate or the air speed, are given by way of indication in the area of each nozzle, differ from one nozzle to the next, and diverge over time owing in particular to the wear and tear on the jets. These systems therefore do not make it possible to monitor and control precisely these spraying parameters in the area of each nozzle, just as much as they do not make it possible to vary these parameters in a large range with the same nozzle to be adapted instantaneously to the vegetation encountered during treatment. Nevertheless, numerous factors such as the nature of the terrain, the age and the variety of grape of the vine, can lead to very different quantities of plant mass from one vine stock to the next that would require pulp flow rates that can be modified quickly and over significant ranges to adapt to the plant masses relative to the spraying nozzles. This point prompts the operator to instead position the calibrations (nozzles, jets, spark gaps) of the machines of the state of the art at their maximum flow rate so as to prevent losing time in changing them as much as is necessary, which then brings about an overabundant consumption of pulp. It therefore cannot be considered with these technologies to imagine dynamic variations of the spraying parameters on the vegetation encountered during treatment,
- The change in flow rate, the adjustment, the cleaning and the maintenance impose a long and labor-intensive human intervention that, taking into account the toxicity of the pulp, requires the use of individual protection and operating procedures that are very restrictive, and even impracticable (change in tens of nozzles or jets to modify a flow rate or to change the treatment product, cleaning of the tanks, and piping of pulp, . . . ),
- The fact that the jets are small in size in order to ensure the effectiveness of the micronization means that the pulp has a high dilution level of the phytosanitary products to keep them from becoming clogged up by pulp agglomerates that are poorly dispersed in water, thus making it impossible to work with small spreading volumes of pulp (less than, for example, 100 liters per hectare, whereas the standard volumes vary within a range on the order of 200 to 800 liters per hectare based on the vegetation and the type of pulp to be sprayed). Actually, the autonomy of the sprayer, taking into account the high level of dilution of the phytosanitary products, requires spraying units comprising large tanks of 1,000 to 2,000 liters of liquids, and consequently equivalent volumes of clear water. The weight of this unit requires powerful towing vehicles to combine the traction of the spraying unit and its operation,
- The pressures that are necessary in the area of the jets are high, meaning that the high-technology pumps are expensive, heavy and bulky and can easily reach values on the order of 30 bar, and demanding significant energy dissipated in the area of the pump,
- The generation of the air stream in the pneumatic or air-assisted technologies is done using a single large-diameter turbine, very noisy, generally combined with a network of flexible sheaths that entrain significant losses of feedstocks, requiring an oversizing of the turbine and actually power on the order of 30 kW entraining a more significant consumption of the towing vehicle. In addition, the turbine has a high inertia that generates a start and stop time of the former over a duration of several seconds, not making possible frequent stop and start sequences during the treatment (end of row, point, momentary absence of vegetation, maneuvering, . . . ), which then brings about a useless and polluting consumption of pulp and fuel.

The centrifugal technology, which is the most recent in this field, makes it possible to solve a portion of the problems posed by the three other above-mentioned technologies.

The document FR 2 497 439 has as its object a spraying installation using the centrifugal technology, in which the droplets are formed by a rotary nozzle of large diameter, on the central part of which a jet projects the pulp to be sprayed. A collector in the form of a ring sector, with a fixed or adjustable angle, is attached opposite the periphery of the rotary nozzle, without contact with it, in such a way as to intercept the pulp that is sprayed into the sector corresponding to the collector and to limit the spraying zone to the part corresponding to the free sector of the collector. The droplets are formed here by exploding due to the centrifugal force of the liquid vein of pulp when it arrives at the end of the nozzle in rotation. This rotary nozzle technology has the advantage of spreading small quantities of pulp, quantities that in the other technologies would require considerably reducing the size of jets to obtain a low flow rate of pulp, by thus increasing the risk of the former being clogged. While using the same jet, the appropriate selection of the angle covered by the collector in ring sector form makes it possible to adjust the flow rate of pulp that is sprayed at the vegetation depending on the size of the open sector in the collector and therefore inevitably less than the flow rate of pulp entering the nozzle.

However, the installation of the document FR 2 497 439 has the following drawbacks:

- The portion of pulp not spread on the vegetation is normally recycled by the collector ring. However, a portion of this pulp is lost in an uncontrolled way by overflowing or draining of the recycled product from the collector, bringing about a loss of pulp and undesirable pollution of the environment. Thus, all of the pulp reaching the area of the jet is not directly projected at the vegetation,
- The recycled pulp loses its characteristics because of its exposure to the atmosphere: the concentration of active products is modified because of a first spraying (by evaporation of water, for example); the pulp can be recycled several times before being spread on the vegetation. Thus, the quality of the pulp sprayed at the vegetation is not constant,

- The flow rate of pulp projected at the vegetation depends on the angle of opening of the free sector of the collector. It is therefore impossible to modify this flow rate on the same plant mat portion opposite the free sector, since only then will a larger plant mat portion be impacted by the opening of the free sector of the collector. The change in flow rate over an identical plant mat portion will then require the changing of the jet with the drawbacks of the above-mentioned technologies,
- The flow rate projected at the vegetation is given by way of indication and cannot be controlled precisely, taking into account losses and recycling of liquid mentioned above,
- The kinetic energy of the droplets for reaching the vegetation is generated only by the rotary nozzle. The drawbacks of the spray jet technology are thus shown.

Still in the centrifugal technology using rotary nozzles that have the effect of micronizing a liquid, i.e., a pulp in liquid form in droplets, the object of the document U.S. Pat. No. 6,152,382 is a modular spraying device that includes at least one spraying module that comprises an exhaust nozzle formed by a cylindrical tube that is open at its two ends, said exhaust nozzle generating a stream of carrier air generated by an axial fan positioned at one of its ends, said stream of carrier air acting at the outlet of the exhaust nozzle on a rotary nozzle, also known as a rotary atomizer, coming in the form of a conical part whose end goes beyond the outlet opening of the exhaust nozzle outside of the latter. Said stream of carrier air is, however, broken down into two laminar air streams, namely an axial laminar air stream around the rotary nozzle and oriented axially so as to distribute the pulp uniformly over a slight thickness of the conical part of the rotary nozzle and to communicate kinetic energy to the droplets generated by centrifuging at the end of the rotary nozzle in a predictable direction, and a helical laminar air stream organized around the axial laminar air stream, with the mixing of the two being performed between the outlet of the module and the plant mat, to make the droplets penetrate into all of the faces of the sheets of said plant mat. The pulp is transported in each module by an intake tube passing through the wall of the chamber of the corresponding module to emerge in the area of the conical outer surface of the rotary nozzle into a zone that is covered by the axial laminar air stream, from a central reservoir and by means of one or more pumps (one pump per ramp for spraying multiple modules) separated from the module that provides a flow rate that is given by way of indication in the area of each module as well as flow rate conditions that are similar from one module to the next. The flow rates in the area of each module are therefore not controlled and cannot be modulated in ranges that essentially differ from one module to the next.

In addition, with the type of device disclosed by the document U.S. Pat. No. 6,152,382, the pulp arrives on the conical surface of the rotary nozzle that is surrounded by the axial laminar air stream generating a draining by a combination of the effect of gravity and the suction generated by the laminar air stream in the area of the intake tube, followed by a pick-up of large drops in the axial laminar air stream, and even passing through the two successive laminar air streams to end outside of the targeted plant surface. Furthermore, the vortex effect of the helical laminar air stream makes the path of the droplets between the outlet of the module and the plant significantly longer, increasing the risk of the droplets drying during this travel, with the latter actually quickly losing the energy that is necessary for reaching the targeted plant. However, also, the means developed for generating each stream of air in a laminar way in the form of two sets of multilayer channels considerably increase the friction surface between the air and these channels and therefore the losses in feedstock inside the module, where the former are also heightened in the shearing zone of air generated at the interface between the two laminar air streams, outside of the module during the mixing between the two laminar air streams, but also during their interaction with ambient air at the module outlet. The electrical yield of the system is thus seriously affected. This system especially requires the installation of two motors per module to generate, on the one hand, the two laminar air streams, and, on the other hand, the micronization of the pulp, which has the result of increasing the weight, the space requirement, and the complexity of managing the system. Finally, the installation of solenoid valves at some distance from the module making it possible to distribute the pulp that arrives on the rotary nozzle does not make it possible, in the event that the supply of the pulp is cut off, to stop instantaneously the production of drops or droplets, taking into account the direct interaction of the axial laminar air stream on the arrival of pulp from the rotary nozzle and the inevitable suction by the axial laminar air stream of the quantity of pulp located between the solenoid valve and the end of the intake tube.

This invention has as its object to remedy at least one of these drawbacks by proposing a spraying module making possible the suction of ambient air and a liquid that comes from a reservoir to generate a stream of carrier air that can project said air stream mixed with said liquid at a controlled variable flow rate in the form of droplets at a target, with a high dynamic, an excellent energy yield, and a very low environmental impact.

Controlled variable flow rate is defined as the flow rate of a liquid obtained from a reservoir and provided by a liquid supply system under the control of and/or monitoring by an electronic intelligence, for example an electronic control and monitoring unit that operates on the basis of a microprocessor, making it possible to adjust a given flow rate according to a corresponding flow rate target and this independently of the pressure of the circuit.

Very low environmental impact is defined as the fact of being able to prevent the projection of pulp outside of the targeted vegetation, being able to spray the exact quantity of pulp by adapting during the spraying the pulp flow rate in a controlled manner based on the targeted vegetation, avoiding any loss of pulp through drainage on the ground, being able to stop the spraying of pulp instantaneously in the absence of vegetation, being able to limit the consumption of clear water for the pulp, or the cleaning of the system, and finally greatly limiting the electrical energy consumption that is necessary to the spraying operation.

For this purpose, the compact spraying module, according to this invention, for the spraying of a liquid in droplet form for the treatment of a target, such as, for example, a plant row, and designed to equip a spraying and control system that comprises a number of spraying modules and a control panel that makes possible the remote individual control of each spraying module, independently of the other modules, with said spraying module comprising a spraying unit comprising, on the one hand, an exhaust nozzle with an air inlet at one of its ends and an air outlet at its other end, with said exhaust nozzle surrounding, along its axis, an inner space that contains at least one spraying element, piping for the supply of liquid of the latter, a fan that can axially generate—in the inner space of the exhaust nozzle—a stream of carrier air around said spraying element to carry toward the target the drops that are created and propelled by the latter in said air stream, preferably in the inner space, and a fan drive system for driving said fan, and in that it also comprises:

- A liquid supply system functionally connected to the piping and comprising an electric pump, preferably a volumetric pump, more preferably a peristaltic pump, if necessary combined with a flow rate sensor, making it possible to push back, at a controlled variable flow rate, the liquid that comes from a reservoir, in said piping, and a connecting interface making it possible for said system to receive the liquid that comes from the reservoir,
- A support that makes it possible to keep the electric pump steady close to the spraying unit,
- An electronic control and/or monitoring unit, for example implanted on an electronic card, provided for the purpose of controlling and/or monitoring the operation of the fan drive system and the liquid supply system by being functionally connected to said drive system and liquid supply system,
- An individual communication interface making to possible to functionally connect the module, directly or indirectly, to the control panel, and an energy supply interface that can be connected functionally to an electrical energy source to make possible the energy supply of said module [sic].

This invention also has as its object a spraying and control system designed to be installed on board a machine or a movable unit, with said system comprising a number of spraying modules for the spraying of a liquid in droplet form for the treatment of a target such as, for example, a plant row, with said liquid coming from a reservoir, being characterized essentially in that it also comprises a control panel comprising an electronic central control unit and a man-machine interface, so-called MIMI, connected to the latter, with each spraying module consisting of a compact spraying module as defined according to this invention and in that the electronic central control unit is functionally connected to each spraying module in such a way as to make remote individual control of each spraying module possible, independently of the other spraying module(s), from said control panel to adjust individually the spraying and operating parameters of each spraying module.

This invention also has as its object a method for controlling a number of spraying modules of a spraying and control system for the spraying of a liquid in droplet form for the treatment of a target, such as, for example, a plant row, with said liquid coming from a reservoir, said spraying and control system being defined according to this invention, being characterized essentially in that it consists in controlling individually each spraying module, independently of the other spraying modules, from the control panel of said spraying and control system to adjust and/or monitor individually the operating and spraying parameters of each spraying module.

Figure 2:
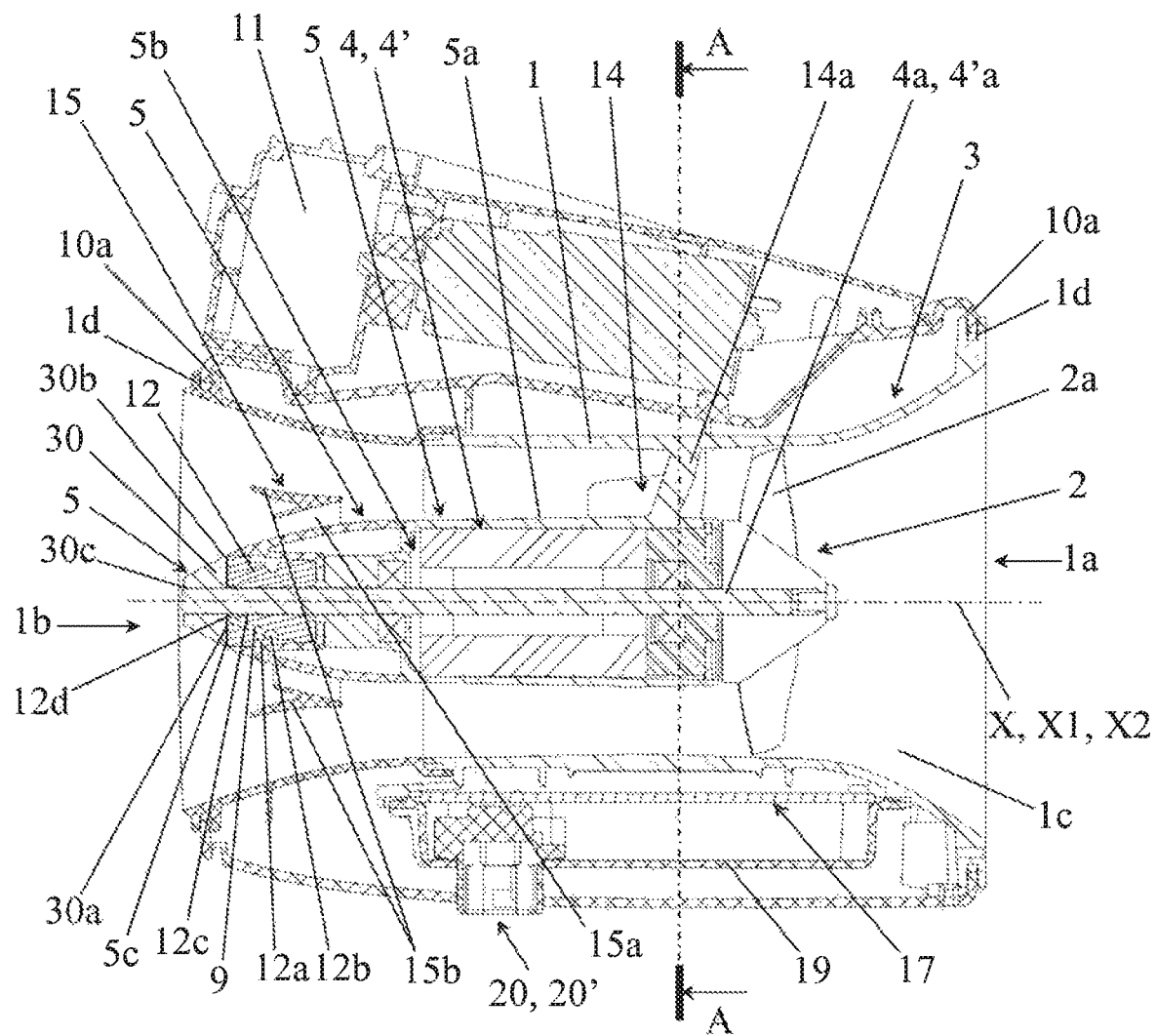
Figure 3:
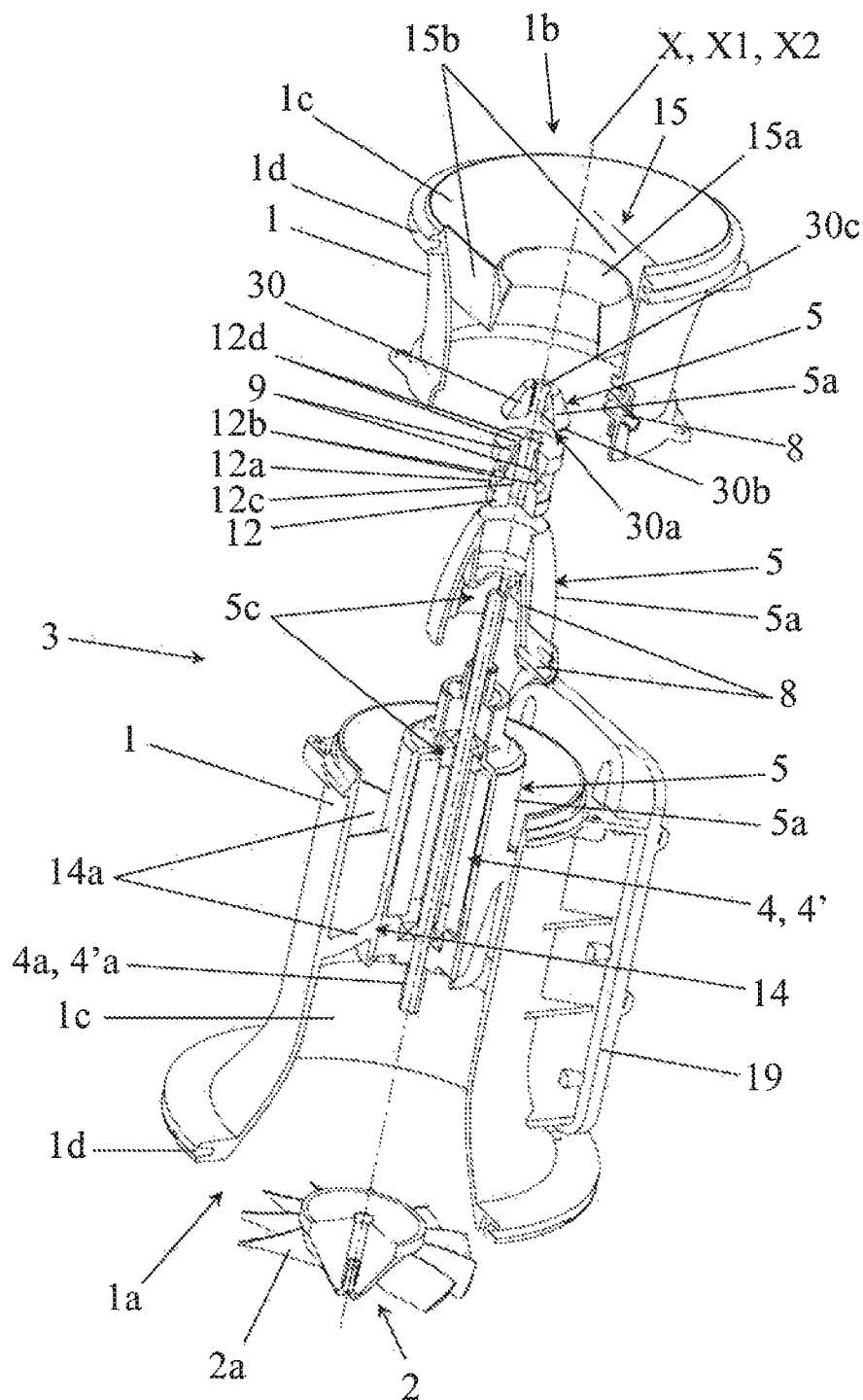
Figure 4A:
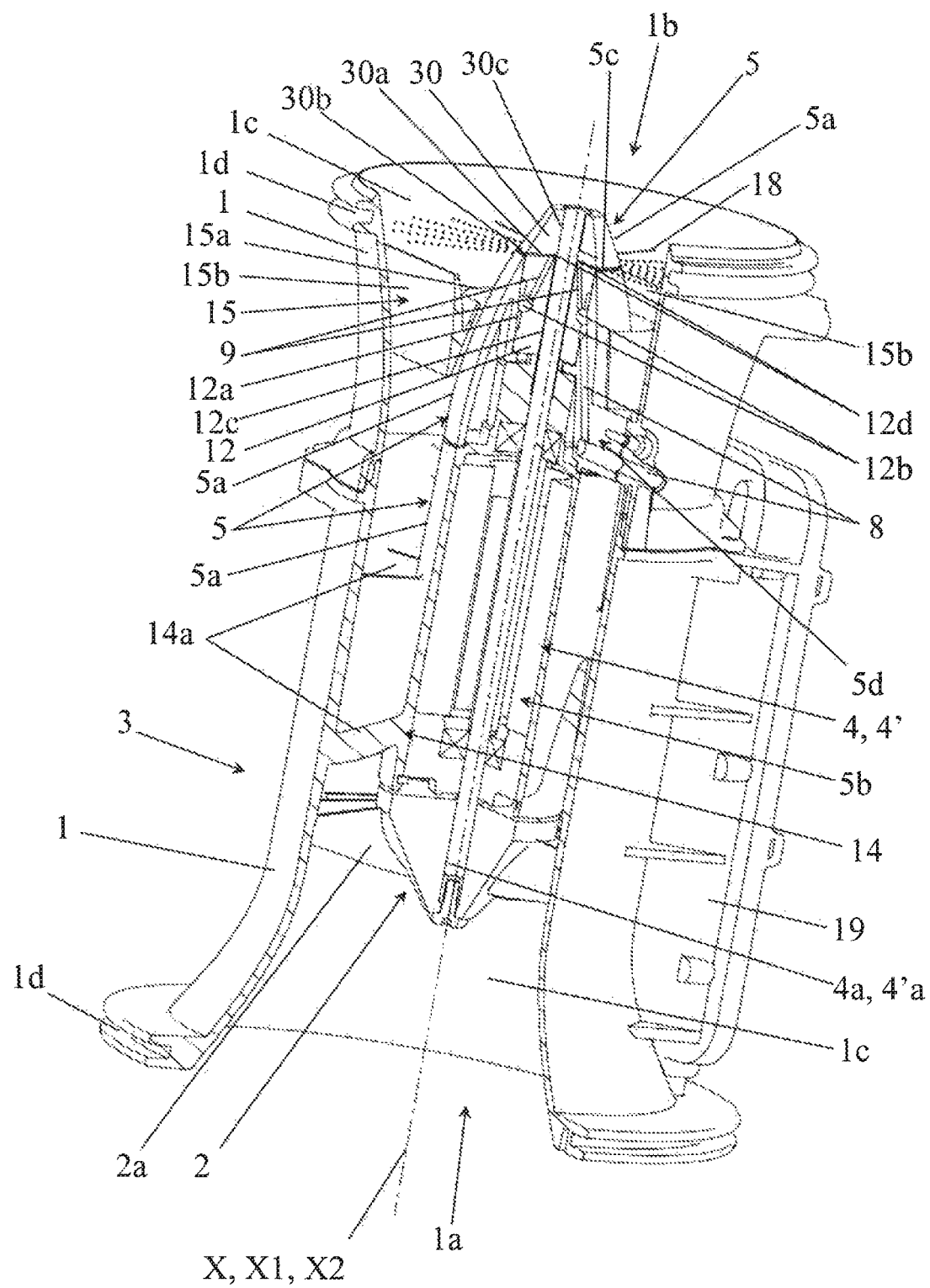
Figure 4B:
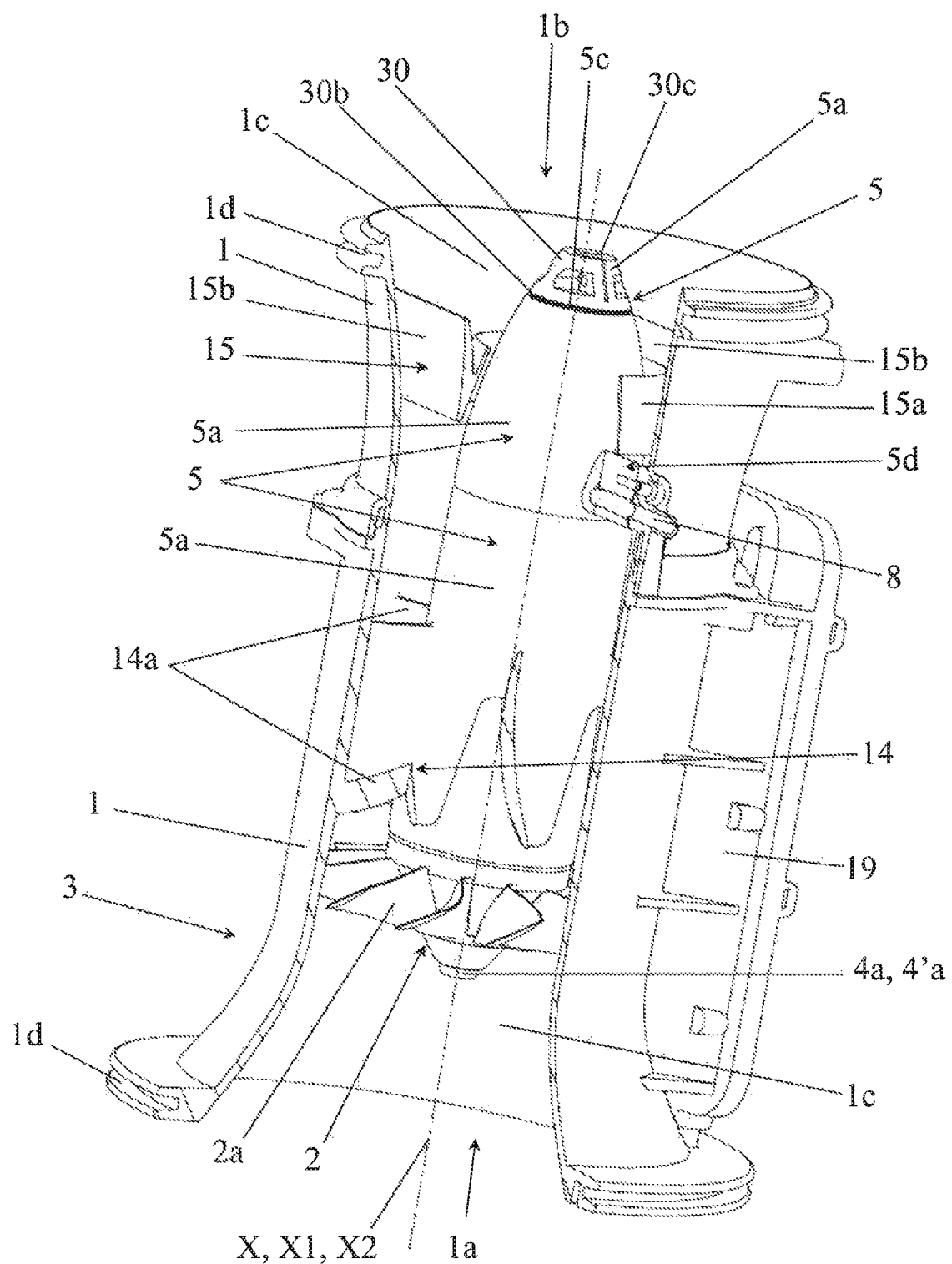
Figure 5:
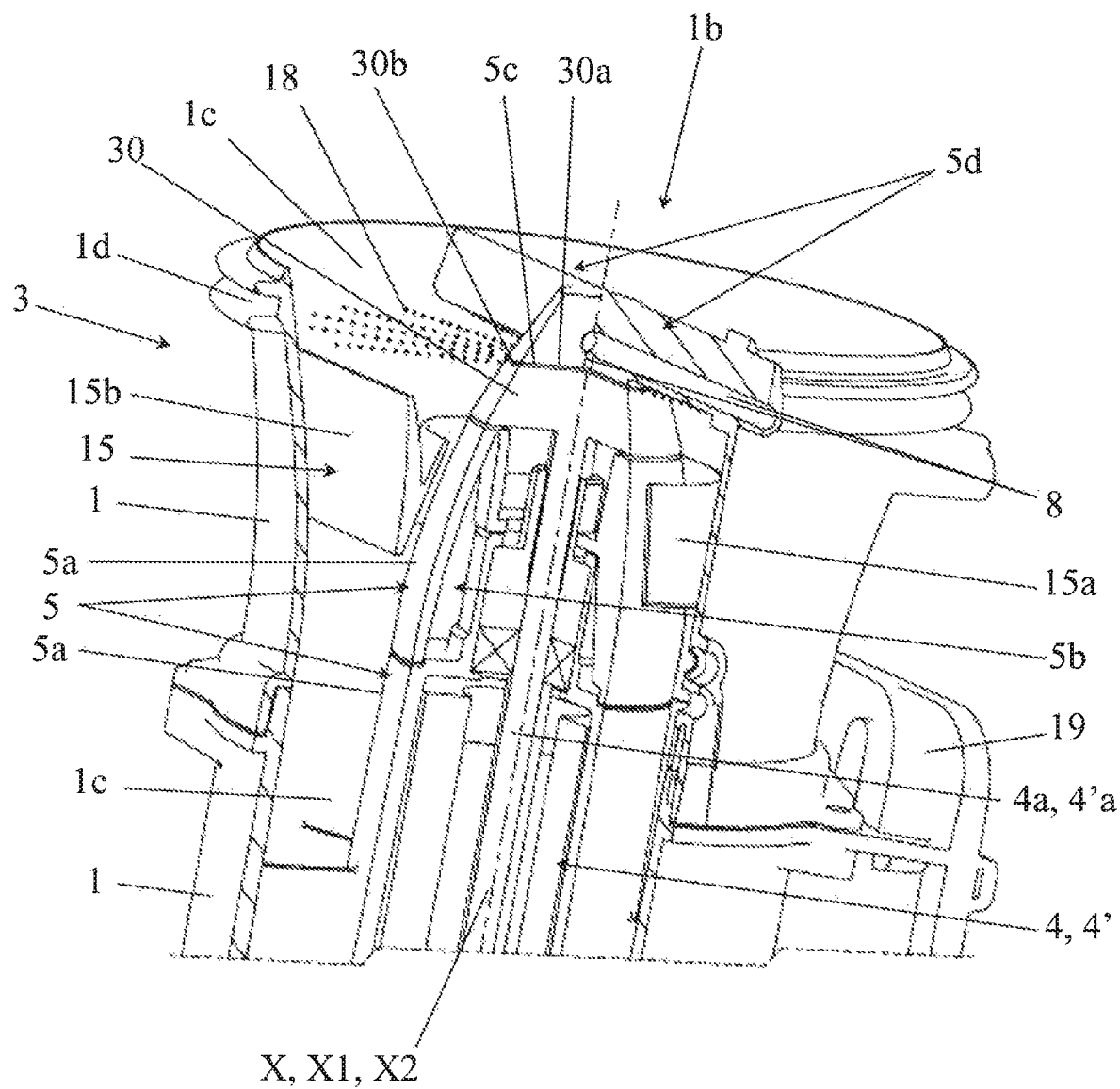
Figure 6:
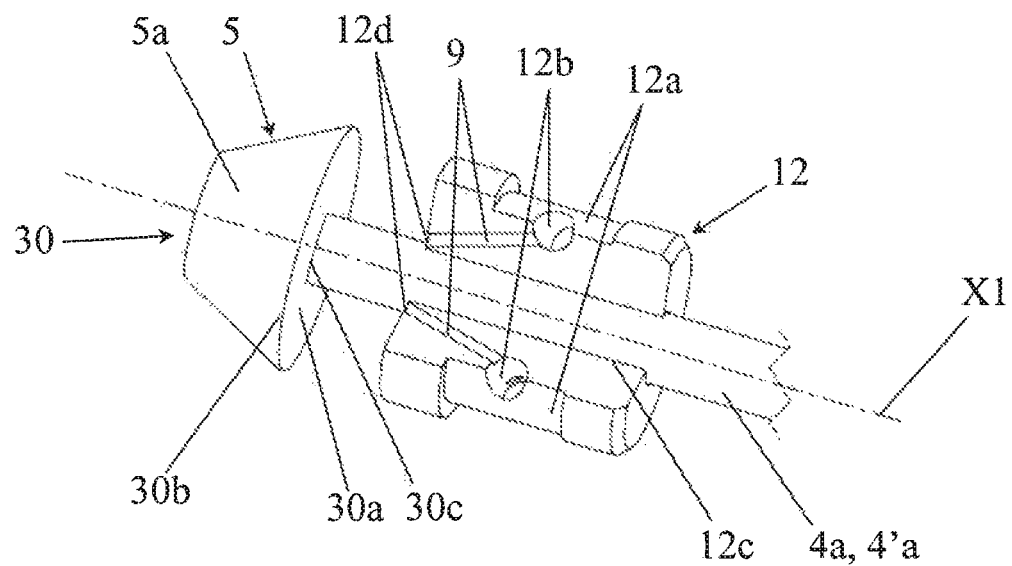
Figure 7:
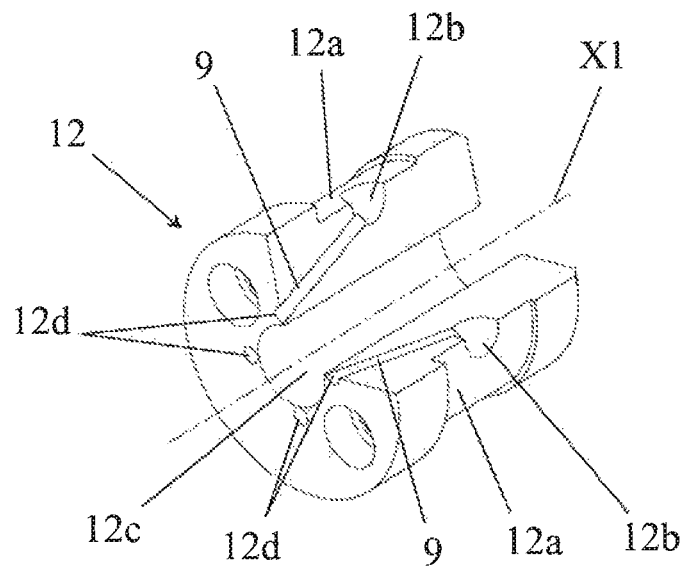
Figure 8:
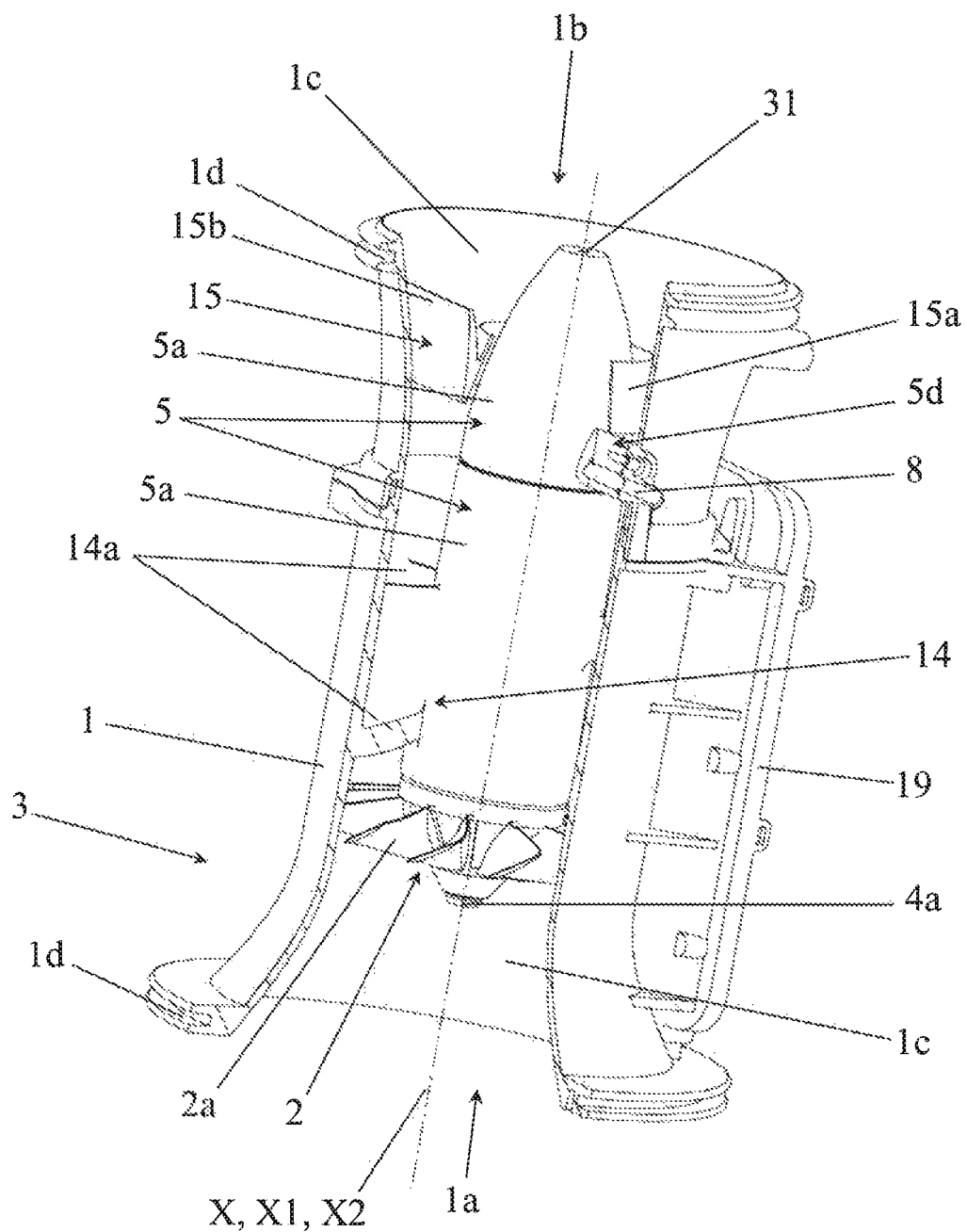
Figure 9:
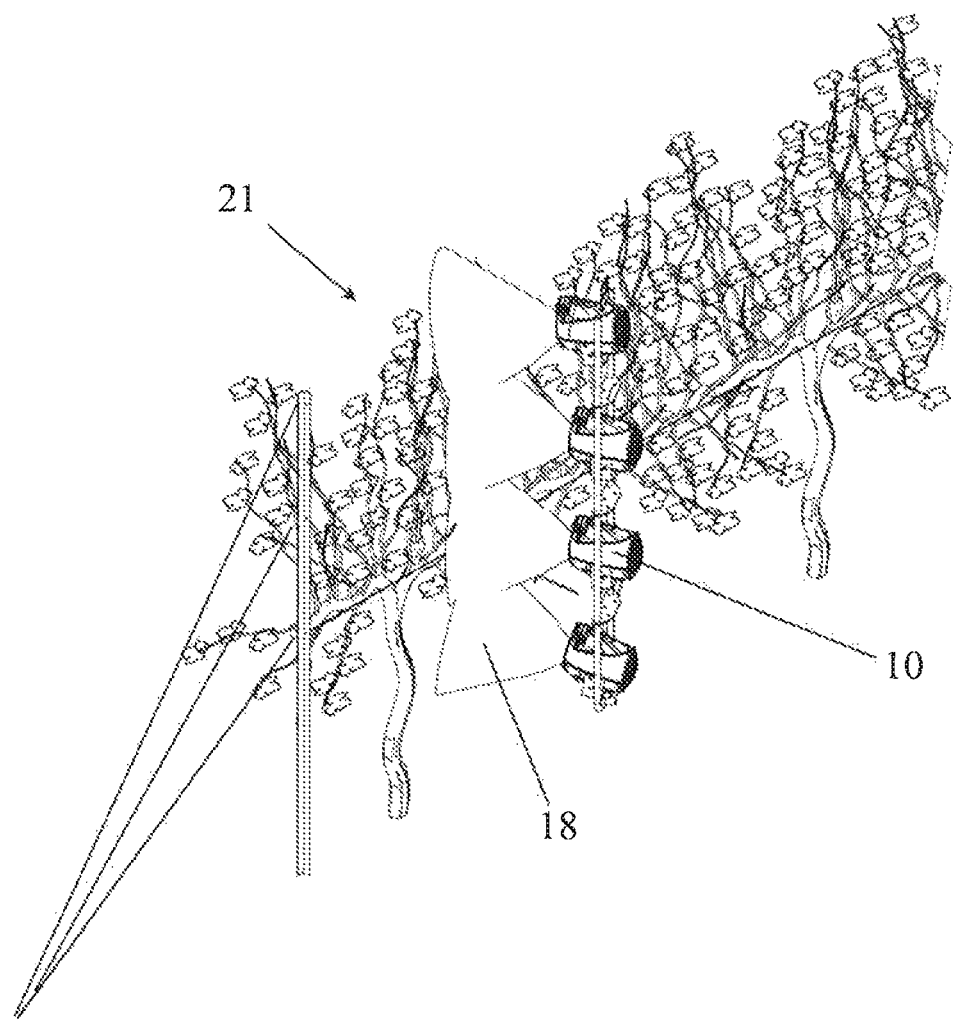
Figure 10:
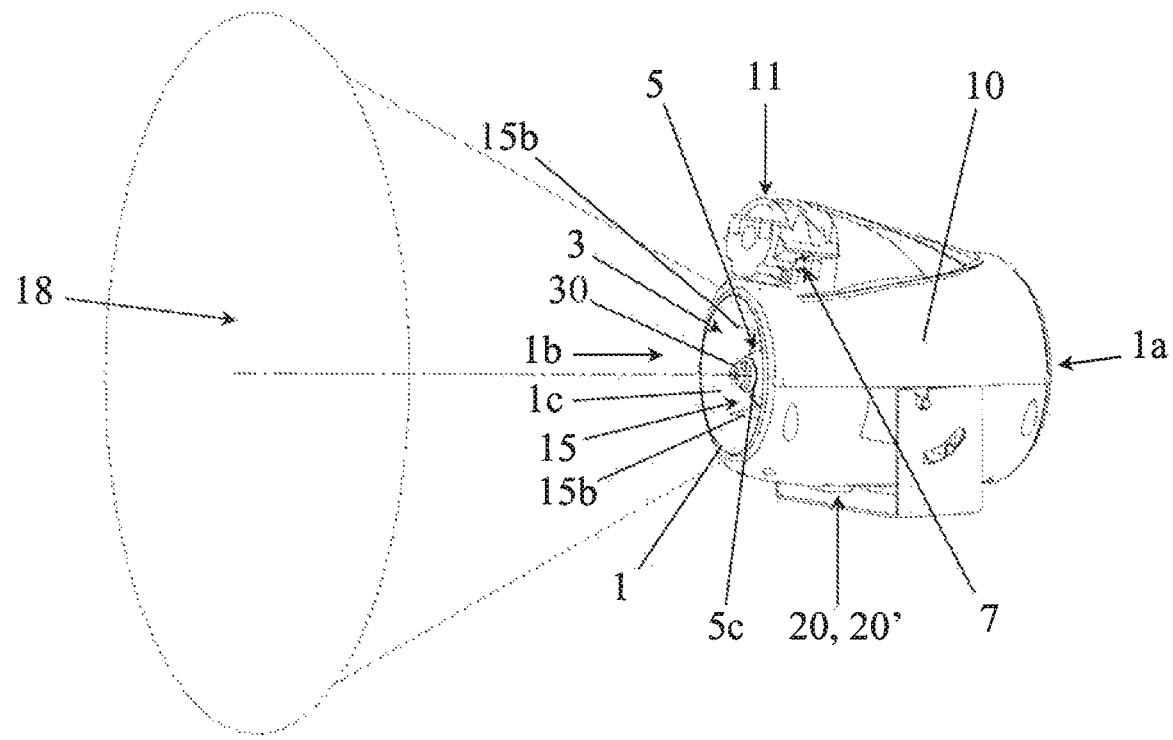
Figure 11:
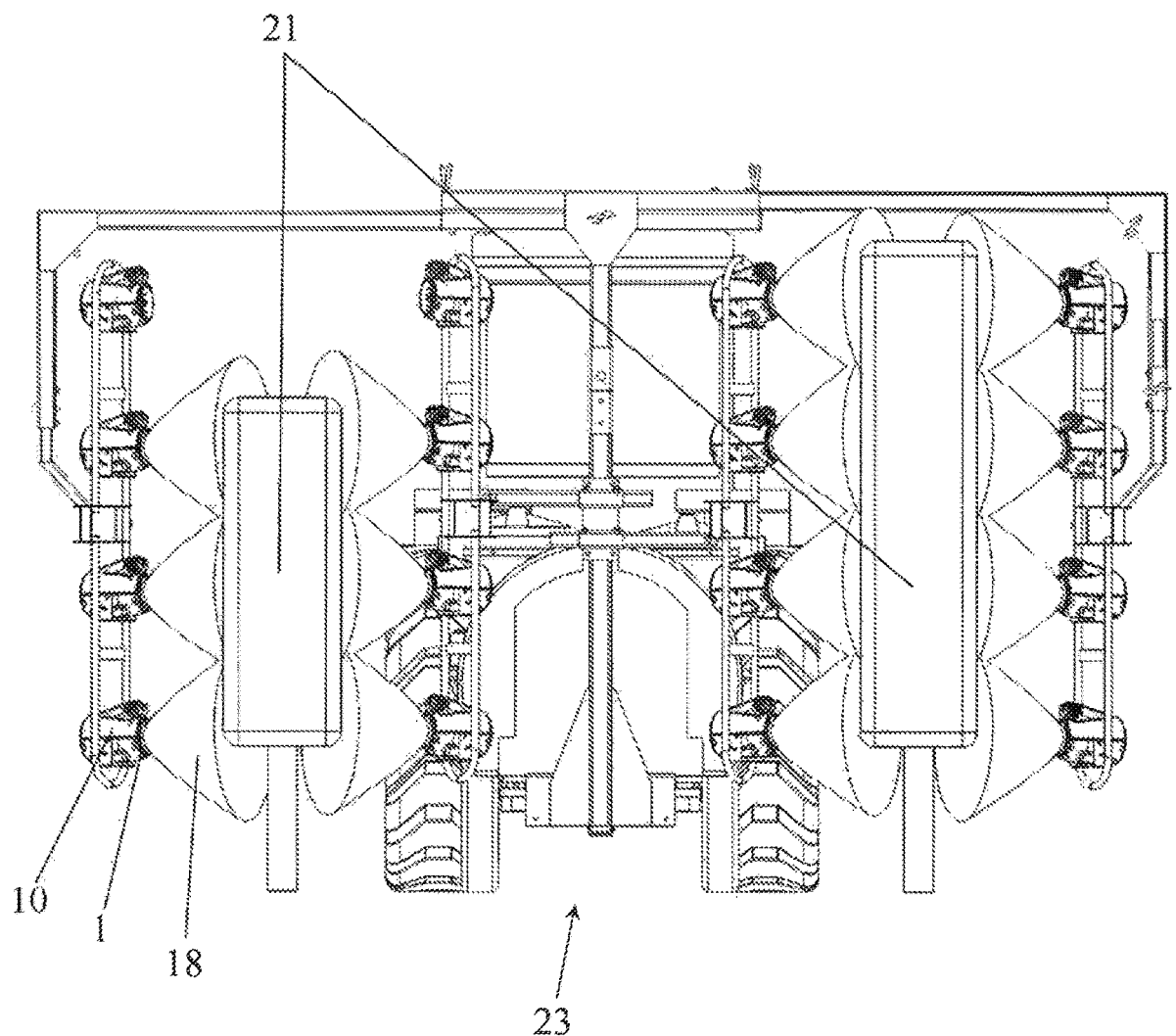
Figure 12:
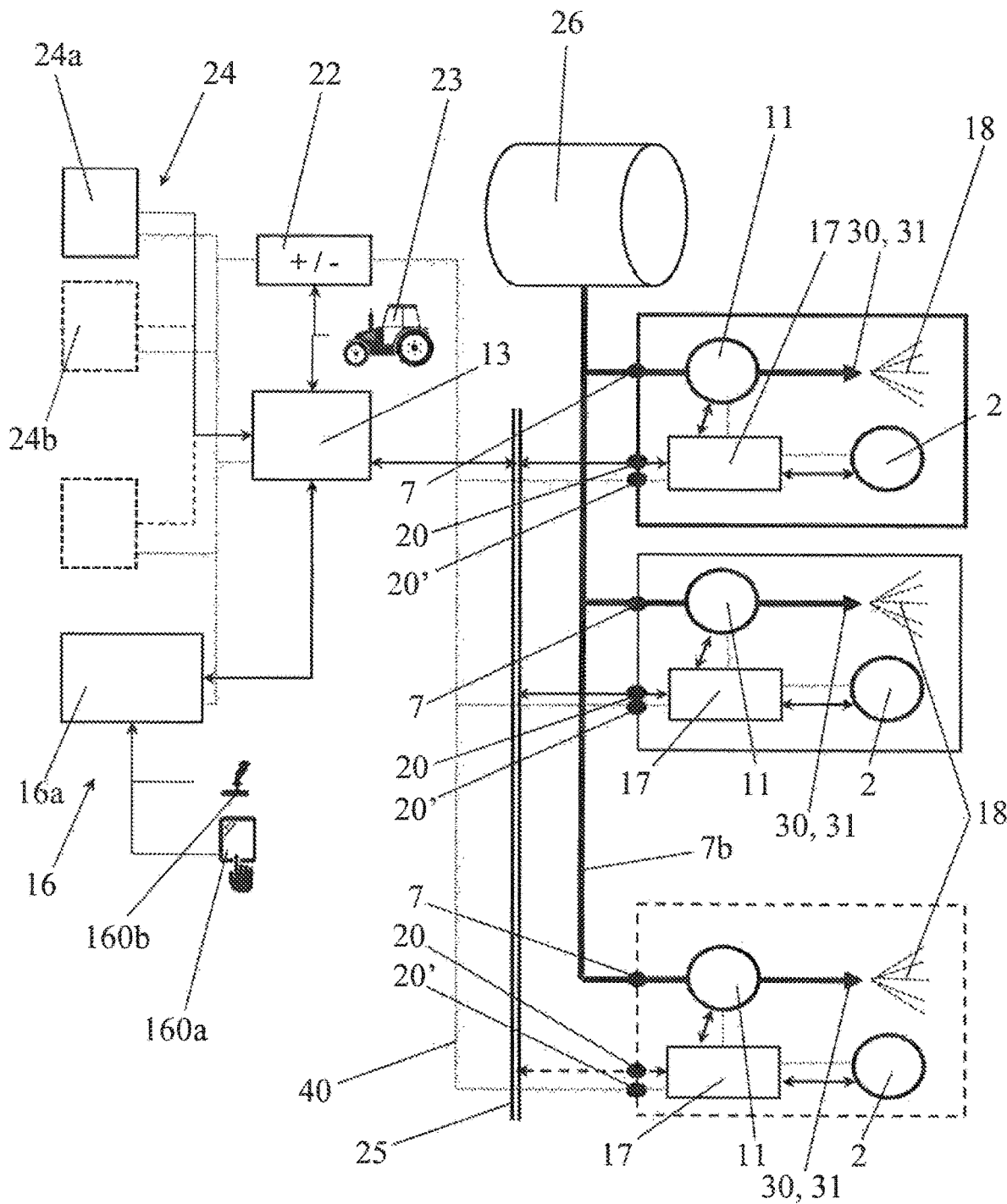
Figure 13:
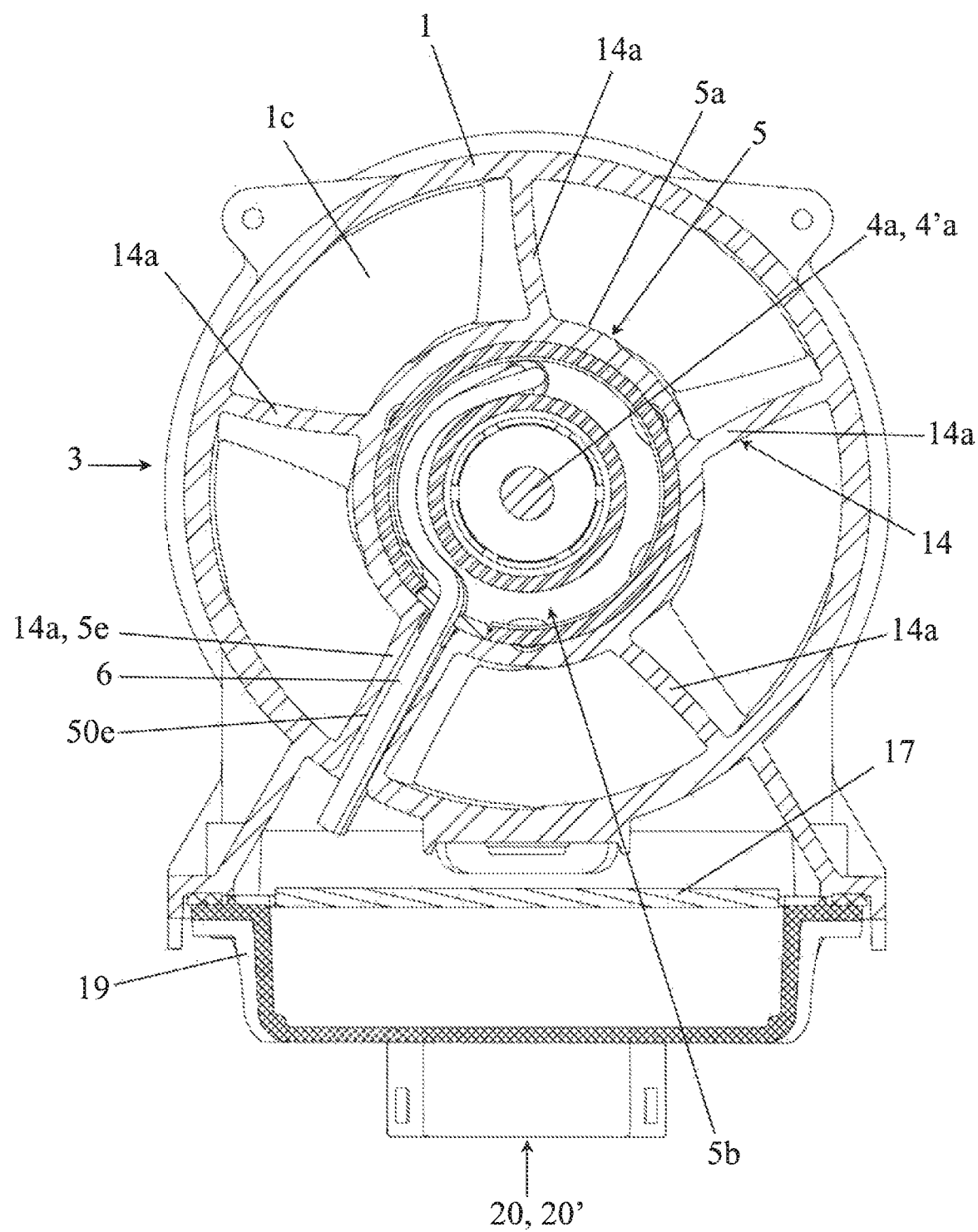

The invention will be better understood owing to the description below, which relates to a preferred embodiment, provided by way of non-limiting example and explained with reference to the accompanying diagrammatic drawings, in which:

FIG. 1 shows a perspective and exploded view of a module according to the invention, in the partially mounted state and comprising a spraying unit in the mounted state, with a spraying element that consists of a rotary atomizer, in a first embodiment of the latter, FIG. 2 shows a longitudinal cutaway view of the module shown in FIG. 1 in the mounted state, FIG. 3 shows a partial perspective and partial exploded view of the spraying unit shown in FIG. 1 in the unmounted state, FIG. 4a shows a partial perspective view of the spraying unit shown in FIG. 3 in the mounted state, with the exhaust nozzle and the fuselage shown partially in such a way as to make the main inner space of the exhaust nozzle and the secondary inner space of the fuselage appear, FIG. 4b shows the spraying unit shown in FIG. 4a, with the fuselage 5 in its entirety, FIG. 5 shows a perspective view of the spraying unit shown in FIG. 4, in the area of its distal end comprising the air outlet opening, and in a second embodiment of the rotary atomizer, FIG. 6 shows a perspective view, with a partial cutaway, of the supply and distribution part and a perspective view of the rotary atomizer, through which the common drive shaft runs axially and which are shown in FIG. 3, FIG. 7 shows only the supply and distribution part, shown in FIG. 6, from the side of its end comprising the supply openings, FIG. 8 shows a perspective view of a module according to the invention with a spraying element consisting of a jet, FIG. 9 shows a perspective view of a ramp of multiple modules of a spraying and control system of the module type shown in FIG. 1, FIG. 10 shows a perspective view of the module shown in FIG. 1 in the mounted state and of the spraying of the liquid in the form of a droplet brush, FIG. 11 shows a rear view of a movable unit that carries a number of modules, carried by ramps, of a spraying and control system according to the invention, FIG. 12 shows a functional diagram of the spraying and control system according to the invention, FIG. 13 shows a partial transverse cutaway view along A-A of the module shown in FIG. 2.

The accompanying figures show a compact spraying module, according to this invention, for the spraying of a liquid in the form of droplets 18 for the treatment of a target 21, such as, for example, a plant row and designed to equip a spraying and control system that comprises a number of spraying modules and a control panel 16 making possible remote individual control of each spraying module, independently of the other modules, with said spraying module comprising a spraying unit 3 comprising, on the one hand, an exhaust nozzle 1 with an air inlet opening 1a at one of its ends and an air outlet opening 1b at its other end. It is also possible to see, in particular in FIGS. 1, 2, 3, 4a, 4b, 5, 8, 10, 13, that the exhaust nozzle surrounds, along its axis X, an inner space 1c that contains at least one spraying element 30, 31, one piping 8, 9 for the liquid supply of the latter, a fan 2 that can generate in the inner space 1c of the exhaust nozzle 1 a stream of carrier air around the spraying element 30, 31 to carry at the target 21 the droplets that are created and propelled by the atomizer 30 in said stream of air, preferably in the inner space 1c, and a fan drive system 4, 4a for entraining said fan.

In accordance with the invention, the spraying element 30, 31 is adapted to transform the liquid into droplets 18 and to propel the latter into the stream of carrier air and preferably into the inner space 1c of the exhaust nozzle 1.

Still in accordance with the invention, such a module also comprises:

- A liquid supply system 7, 11, functionally connected to the piping 8, 9 and comprising an electric pump 11, preferably a volumetric pump, more preferably a peristaltic pump, if necessary combined with a flow rate sensor that makes it possible to push back, with a controlled variable flow rate, the liquid, coming from a reservoir 26, into said piping 8, 9, and a connection interface 7 that makes it possible for said system to receive the liquid coming from the reservoir 26, A support 10 that makes it possible to keep the electric pump 11 steady close to the spraying unit, An electronic control and/or monitoring unit 17, for example implanted on an electronic card, provided for the purpose of controlling and/or monitoring the operation of the fan drive system 4, 4a and the liquid supply system 7, 11 by being functionally connected to said drive and liquid supply systems, An individual communication interface 20 making it possible functionally to connect the module, directly or indirectly, to the control panel 16 and an energy supply interface 20' that can be functionally connected to an electrical energy source 22 to make possible the energy supply of said module.

The liquid is also commonly called pulp in the winemaking trade.

The electrical energy source 22 can consist of, for example, an electric generator coupled to a movable unit 23 such as a towing vehicle, with the energy able to be distributed by an electrical supply network 40 (FIG. 12).

The piping 8, 9, making it possible to supply with liquid the spraying element 30, 31 in the spraying unit 3, can be connected to the electric pump 11. The latter can be connected hydraulically, via a connecting interface 7 and a hydraulic connection 7b, to the reservoir 26 (see in particular FIGS. 1, 10, and 12).

In a preferred embodiment, as can be seen in FIGS. 1, 2, 3, 4a, 4b, 5, 6 and 10, the spraying element can consist of a rotary atomizer 30 that is mounted in rotation around an axis X1, and the module according to the invention can also comprise a rotary atomizer drive system 4', 4'a that is provided for the purpose of being able to transmit the torque and the rotation to the rotary atomizer 30, with the latter being able, under the action of its rotation, to break up by centrifuging the liquid into droplets 18 and propelling them into the stream of carrier air, preferably in a plane that is essentially perpendicular to the axis of the exhaust nozzle 1, preferably in the inner space 1c of the exhaust nozzle 1.

The rotary atomizer drive system 4', 4'a can comprise an electric motor 4', preferably an electric motor without brushes, functionally connected to the electronic control and/or monitoring unit 17, and a drive shaft 4'a that can be driven in rotation around its axis X1 by said electric motor and can transmit the torque and the rotation to the rotary atomizer 30 (FIGS. 2, 3, 4a, 4b, 5).

In a preferred embodiment, the fan drive system 4, 4a and the rotary atomizer drive system 4', 4'a can be provided in such a way as to form a single fan and rotary atomizer drive system 4, 4a, 4', 4'a that is common to both the fan 2 and the rotary atomizer 30. Such a common fan and rotary atomizer drive system can comprise a single common electric motor 4, 4', preferably an electric motor without brushes, a so-called brushless motor, functionally connected to the electronic control and/or monitoring unit 17 and a single common drive shaft 4a, 4'a that can be driven in rotation around its axis of rotation X1, X2 by said common electric motor and can transmit the torque and the rotation both to the fan 2 and to the rotary atomizer 30. The first and second axes of rotation X1, X2 can then be combined. Such an embodiment makes it possible to reinforce or to improve the compactness of the spraying unit 3 and the spraying module. The applicant carried out numerous tests showing that the range of variation of the rotation speed of the propeller 2a that generates the stream of carrier air, combined with the size of the droplets 18 obtained by the rotary atomizer 30 in this range, exhibited satisfactory adjustment characteristics and no common measurement with the existing technologies. Thus, the embodiment based on a drive system with a common electric motor has the effect of simplifying the embodiment and the management of the module while increasing its compactness and its reliability. It was also demonstrated that the rotary atomizer 30 had the capacity of transforming into droplets 18 a liquid flow rate that can vary over a very wide range of flow rate values, without a common measurement there also with the existing solutions, and with all of the droplets being mixed in this case in a fairly homogeneous way in the air stream without a noticeable loss of liquid through drainage. In addition, in the tests conducted in the wine-making industry, the applicant noted very significant savings in energy consumption compared to the main technologies used to date.

More particularly, it is possible to see, in particular in FIGS. 1, 2, 3, 4a, 4b, that the exhaust nozzle 1 can be formed by a pipe that extends along a longitudinal axis X by delimiting on the inside the main inner space 1c and being open at its ends to form the air inlet opening 1a and the air outlet opening 1b and that the rotary atomizer 30 can comprise a receiving surface 30a that is provided for the purpose of receiving the liquid and ensuring, on its periphery or its end 30b, in the state of rotation of said rotary atomizer 30 around a first axis of rotation X1, the breaking-up of liquid into droplets 18 and their propulsion into the stream of carrier air. It is also possible to see that the fan 2 can comprise at least one propeller 2a that is mounted in rotation around a second axis of rotation X2 and makes it possible to generate the stream of air in the exhaust nozzle 1 in an axial direction toward and beyond the outlet opening 1b.

If reference is now made to FIG. 8, it is possible to see that, in another embodiment, the spraying element can consist of a jet 31 that may or may not be variable. According to this invention, jet 31 will be understood as one or more holes or passages allowing liquid to pass, preferably and in a known manner of small size, making it possible to transform, at a spraying point, the pressurized liquid upstream, transported by the piping 8, into droplets downstream. Variable jet 31 will be defined as a device that comprises several jets that can each deliver different flow rates, able to position one of them in interaction with the piping 8, for example of the type that is known and described in the document FR 3 005 877 that describes a nozzle support device able to comprise several nozzles and therefore several jets, of different sizes and each able to be actuated and moved from an inactive point to the spraying point working with the piping 8, or a device that can cause the size of the jet and thus the delivered flow to vary, for example of the type using a movable needle system whose interaction with the jet makes it possible to adapt the surface and the passage geometry of the liquid.

As can be seen in FIGS. 1, 2, 3, 4a, 4b, 5, 8 and 10, the spraying unit 3 can also comprise an inner fuselage 5 that has an aerodynamic profile that is defined by a lateral surface that delimits on the inside a secondary inner space 5b and that can be kept essentially coaxial in the main inner space 1c between the fan 2 and the air outlet opening 1b in such a way as to define, between the fuselage 5 and the exhaust nozzle 1, a channel for circulation of the stream of carrier air surrounding said fuselage 5.

As can be seen in FIGS. 1, 2, 3, 4a, 4b, 5, 10, the fuselage 5 can comprise a rotary section in the spraying state that can be formed by the spraying element 30 or 31 that consists in the rotary atomizer 30 itself in such a way that the periphery or the end 30b, preferably smooth, of the receiving surface 30a essentially can be part of the lateral surface of the fuselage 5 while making possible the rotation of the rotary atomizer 30 and the propulsion, preferably essentially perpendicularly to the longitudinal axis X, of the droplets 18 in said channel.

As can be seen in FIG. 8, the fuselage 5 can comprise a section that can be formed by the spraying element 31 that consists of the jet 31 that may or may not be variable. In this case, the jet 31 can be integrated into the fuselage 5, preferably in the section that forms the end of the fuselage 5 rotated toward the outlet opening 1b, and the jet 31 can be made in said end of the fuselage 5 to cause it to emerge at the outside. It will be understood that the piping 8, not visible in FIG. 8, can pass through the secondary inner space 5b of the fuselage 5 up to the jet 31, upstream from the latter.

The channel for circulation of the air stream can then concentrically surround the fuselage 5 along the longitudinal axis X of the exhaust nozzle 1 and the spraying element 30 or 31.

In contrast, it is possible to see in FIG. 13 that the spraying unit 3 can comprise connecting means 6, able to comprise electrical wires, which can be provided for the purpose of functionally connecting the energy supply interface 20' to the electronic control and/or monitoring unit 17, to the fan drive system 4, 4a, to the electric pump 11, and, if necessary, to the rotary atomizer drive system 4', 4'a.

The connecting means 6 can also comprise electrical wires that make it possible functionally to connect the electronic control and/or monitoring unit 17 to the individual communication interface 20 that is functionally connected to the control panel 16 and in particular to the electronic central control unit 13.

Preferably, as can be seen in FIGS. 1, 2 and 13, the energy supply interface 20' and the individual communication interface 20 can be located at the same point in the module that comes, for example, in the form of a multi-path connector.

The individual communication interface 20 can also be provided for the purpose of comprising a radiofrequency transmission circuit that makes possible the transmission by radiofrequency means of the communication signals that are necessary to the operation of the module.

In the state of operation of the spraying unit 3, the rotary atomizer 30, more particularly the periphery or the end 30b of the rotary receiving surface 30a, can thus be entirely surrounded by the stream of carrier air generated by the fan 2 in such a way as to be able to propel or to project all of the droplets into the space of the air stream, preferably inside the exhaust pipe 1 (see in particular FIGS. 1, 2, 4a, 4b, 5, 10), which has the effect of ensuring their homogeneous mixing in said air stream that will then carry them toward the target (for example, the vegetation) in the form of a treatment brush.

The spraying element 30 or 31 can preferably be placed close to the air outlet opening 1b.

Thus, the fact that the spraying element 30 or 31 forms a moving or stationary part of the fuselage 5 or falls within a part of its lateral surface or end, i.e., for example, that the periphery or the end 30b of the receiving surface 30a of the rotary atomizer 30 is part of the lateral surface 5a of the fuselage 5 or that the jet 31a is part of the end face of the fuselage 5, makes it possible, on the one hand, to promote the flow of the stream of carrier air around the spraying element 30 or 31 and to limit the number of obstacles in the stream of carrier air as well as the turbulence generated by the latter at the exhaust nozzle outlet 1, and, on the other hand, to facilitate the incorporation of the droplets 18 in the stream of carrier air to carry them to the target 21. The absence of deposition and liquid drops on the inner wall of the exhaust nozzle 1 at the module outlet also makes it possible to verify the integration of all of the droplets in the stream of carrier air.

It will be noted that the fuselage 5, outside of the section formed by the spraying element 30 or 31, can be made of several parts or sections that are assembled with one another, preferably in a removable or detachable manner, for example to be able to access various elements that are contained in the secondary inner space 5b of the fuselage 5 so as to carry out their changing or their maintenance (FIGS. 2, 3, 4a, 4b, 5 and 8).

The propeller 2a of the fan 2 generates the stream of carrier air during its rotation and by suction of the ambient air through the air inlet opening 1a.

Preferably, the first and second respective axes of rotation X1, X2 of the rotary atomizer 30 and the propeller 2a can be combined or essentially combined with one another, and, preferably, combined or essentially combined with the longitudinal axis X of the exhaust nozzle (FIGS. 1, 2, 3, 4a, 4b, 5). This characteristic is advantageous for limiting the space requirement of the exhaust nozzle 1 in the plane that is perpendicular to the common axis.

Preferably, the fan drive system 4, 4a and, if necessary, the rotary atomizer drive system 4', 4'a can be housed in the secondary inner space 5b of the fuselage 5, so as to prevent the stream of carrier air from being disrupted by the presence of this or these drive system(s).

More particularly, if necessary, the brushless motor exhibits advantages of a fast rotation speed, preferably more than 15,000 rpm, with a low inertia to ensure fast changes in rotation speed and a low weight.

The fuselage 5 can comprise at least one cooling section surrounding the electric motor or motors 4 and being in contact with the stream of carrier air, with said section able to be made of aluminum or another material promoting cooling or limiting heating of the electric motor or motors 4 placed in this fuselage section 5.

Preferably, the spraying element 30, 31 can be provided in such a way as to be able to eject the droplets 18 in a transverse direction that is essentially perpendicular to the longitudinal axis X of the exhaust nozzle 1. If necessary, the receiving surface 30a of the rotary atomizer 30 can be provided for extending in a plane that is essentially perpendicular to the longitudinal axis X of the exhaust nozzle 1, so as to be able to eject the droplets 18 in said transverse direction.

In a preferred embodiment, the rotary atomizer 30 can have overall the shape of a disk or a truncated or conical part, and at least one of the outer faces of the disk or the truncated or conical part can form the receiving surface 30a (FIGS. 1, 2, 3, 4a, 4b, 5, 6, 10).

The section of the fuselage 5 and/or the exhaust nozzle 1 can be variable, in dimensions and/or in shape, along its longitudinal axis, as can be seen in FIGS. 2, 3, 4a, 4b, 5 and 8. For example, the section of the exhaust nozzle 1 can be provided for the purpose of being enlarged in the area of its air inlet opening 1a and air outlet opening 1b. Preferably, the air outlet opening 1b can have an oval shape. Thus, the droplet brush 18 obtained at the outlet of the exhaust nozzle can have an oval and essentially flattened shape in the area of the vegetation. Such an oval shape is particularly effective for obtaining a homogeneous brush, in combination, if necessary, with the diffuser device 15*a*, 15*b*.

The rotary atomizer 30 can be pierced centrally and axially by a bore 30*c* for making possible the passage of the drive shaft 4*a* making possible its rotation around the first axis of rotation X1 (FIGS. 2, 3, 4*a*, 4*b*, 6) via a drive connection, such as, for example, a connection by pins, keys, grooves or teeth, or, as can be seen in FIGS. 1, 3, 4*a*, 4*b*, 6, by pinching or wedging on the drive shaft 4*a* or fitting the latter by force into the bore 3*c*. The drive shaft 4*a* can also be provided in a variant by being made of a single part with the rotary atomizer 30 (FIG. 5).

In a preferred embodiment of the piping 8, 9, it is possible to see, in particular in FIGS. 3, 4*a*, 4*b* and 5, that the former can comprise a main feed pipe 8 provided for the purpose of receiving the liquid coming from the liquid supply system 7, 11 and for the purpose of supplying with liquid, directly or indirectly, at at least one supply point, the spraying element 30, 31, if necessary the rotary receiving surface 30*a* or the jet 31.

If reference is made to FIGS. 2, 3, 4*a*, 6, 7, it is possible to see that in the case where such a main feed pipe 8 is provided for the purpose of supplying the receiving surface 30*a* of the rotary atomizer 30 with liquid indirectly, the invention can provide that the piping 8, 9 can also comprise for this purpose at least two secondary feed pipes 9, each provided for the purpose of being connected to said main feed pipe 8 and being located in the secondary inner space 5*b* of the fuselage 5. The spraying unit can also comprise an intermediate part for supply and distribution 12 that can comprise the secondary feed pipes 9 and that can be placed in the secondary inner space 5*b* of the fuselage 5 between, on the one hand, the fan 2, if necessary the electric motor 4, and, on the other hand, the rotary atomizer 30, in immediate proximity to the latter in such a way that each secondary feed pipe 9 can emerge separately from the stream of carrier air facing it and in immediate proximity to the receiving surface 30*a* to supply it with liquid at at least two supply points, preferably distributed on both sides of the first axis of rotation X1, if necessary on both sides of the drive shaft 4*a* that makes it possible to ensure the rotation of the receiving surface 30*a* around the first axis of rotation X1.

The high-speed rotation of the receiving surface 30*a* of the rotary atomizer 30 has the effect of distributing, outside of the stream of carrier air, the liquid received by the latter, up to the periphery or the end 30*b* of said receiving surface 30*a*, i.e., up to the or one of the edges forming its periphery or its end, where the liquid will be broken up into droplets 18 that will then be projected immediately into the stream of carrier air that surrounds the rotary atomizer 30 and in particular the periphery or the end 30*b* of its rotary receiving surface 30*a*.

If reference is made again to FIGS. 2, 3, 4*a*, 6 and 7, it is possible to see that the intermediate part for supply and distribution 12 can comprise an annular groove 12*a* for distribution of the liquid that can comprise at least two openings 12*b* that each emerge into one of the secondary feed pipes 9. In addition, the main feed pipe 8 can be provided for the purpose of emerging into the annular groove 12*a* that can thus ensure the distribution of liquid, transported from the electric pump 11 via the main feed pipe 8, into the secondary feed pipes 9.

Preferably, as can be seen in particular in FIGS. 6 and 7, the intermediate supply and distribution part 12 can have an overall cylindrical shape and can be pierced at one of its end faces, which can be oriented, for example, by being rotated toward the air inlet opening 1*a* or air outlet opening 1*b* of the exhaust nozzle 1, through at least two feed holes 12*d* respectively forming the liquid supply points. In addition, the annular distribution groove 12*a* can be made in the outer lateral face of the supply and distribution part 12, and the secondary feed pipes 9 can be made of the same material as the intermediate supply and distribution part 12 in such a way as to emerge at one of their ends into the annular groove 12*a* and at their other end into one of said feed holes. In contrast, the fuselage 5 can be designed in its part receiving the intermediate supply and distribution part 12 to surround the annular groove by ensuring a fluid sealing with the latter (see in particular FIGS. 2, 4*a* and 5).

A passage bore 12*c* that allows the passage of the drive shaft 4*a*, which drives in rotation the rotary atomizer 30 (FIGS. 2, 3, 4*a*, 6 and 7), can run through the intermediate supply and distribution part 12 axially.

The fuselage 5 extends longitudinally or axially between two ends, one of which, so-called distal end, is, in the mounted state in the exhaust nozzle 1, the farthest from the fan 2 or the closest to the outlet opening 1*b*, and the other, so-called proximal end, is the farthest from the outlet opening 1*b*. In a preferred embodiment of the axial or longitudinal position of the rotary section of the fuselage 5 formed by the rotary atomizer 30, the invention can provide that the rotary section can form the distal end of the fuselage 5 (FIGS. 1, 2, 3, 4*a*, 4*b*, 5, 9).

As can be seen in FIGS. 1, 2, 3, 4*a*, 4*b*, 5, 10, the lateral surface 5*a* of the fuselage 5 can be closed or perforated, and can be continuous or discontinuous. Preferably, so as to obtain an increased effectiveness of the flow of the air stream along the fuselage 5 at least up to its section formed by the spraying element 30 or 31, the lateral surface 5*a* can be closed, i.e., continuously, along the fuselage 5 at least between its proximal end and the spraying element 30 or 31.

In a first embodiment of the fuselage 5 combined with the rotary atomizer 30, as can be seen in FIGS. 1, 2, 3, 4*a*, 4*b*, the receiving surface 30*a* of the rotary atomizer 30 can be located in the secondary inner space 5*b*, and the axial or longitudinal continuity of the lateral surface 5*a* of the fuselage 5 can be interrupted by a transverse passage slot 5*c* that makes possible the propulsion of droplets into the stream of carrier air through the lateral surface 5*a* of the fuselage 5. The passage slot 5*c* can be delimited by two outer peripheral edges opposite, and one of said outer peripheral edges can be formed by the periphery or the end 30*b* of the receiving surface 30*a*. The passage slot 5*c* also makes it possible—during a shutdown of the liquid supply and always in the state of rotation of the rotary atomizer 30—to stop the diffusion of the droplets 18 immediately by holding the liquid inside the secondary inner space 5*b* by capillary action, the capillary action generated essentially by the proximity to the peripheral edges of the passage slot 5*c* in the area of the lateral surface 5*a* of the fuselage. Upon resumption of the liquid supply, it actually makes it possible for droplets to be generated by centrifugal action in the area of the end 30*b* of the receiving surface 30*a*. In this first embodiment of the fuselage 5, the rotary atomizer 30 can have a pointed-arch or conical or truncated shape with an outer end face that can be located in a plane that is essentially perpendicular to the longitudinal axis X of the exhaust nozzle 1 and that can be rotated toward the inlet opening 1*a* of the exhaust nozzle 1. Such an outer end face can form the receiving surface 30*a* of the rotary atomizer.

In a second embodiment of the fuselage 5 combined with the rotary atomizer 30 or the jet 31, the distal end of the fuselage 5 can end in an outer end face, if necessary through which the jet 31*a* passes, extending into a plane that is essentially perpendicular to the longitudinal axis of the exhaust nozzle 1 and that is rotated toward the air outlet opening 1*b*. Such an outer end face can form the receiving surface 30*a* of the rotary atomizer 30 or an end face that comprises the jet 31 (FIG. 5, FIG. 8).

As can be seen in particular in FIGS. 3, 4*a*, 4*b* and 5, the fuselage 5 can comprise a lateral liquid supply extension 5*d* that can advantageously exhibit an aerodynamic profile and in which extension can be made a liquid supply channel that can form at least in part the main feed pipe 8. In addition, the lateral liquid supply extension 5*d* can extend transversely, preferably perpendicularly, to the longitudinal axis of the exhaust nozzle 1 in the channel for circulation of the stream of carrier air.

As can also be seen in FIG. 13, the fuselage 5 can comprise a lateral electrical supply extension 5*e* that can advantageously exhibit an aerodynamic profile. In addition, the lateral electrical supply extension 5*e* can extend transversely, preferably perpendicularly, to the longitudinal axis X of the exhaust nozzle 1 and, through said extension, an electrical supply channel 50*e* that forms a passage for the connecting means 6 can run into the channel for circulation of the stream of carrier air. Preferably, in the case where the spraying unit 3 comprises a lateral liquid supply extension 5*d*, the lateral electrical supply extension 5*e* can be diametrically opposite to the lateral liquid supply extension 5*d*.

In contrast, if reference is made to FIGS. 2, 3, 4*a*, 4*b*, 5 and 13, it is possible to see that, in such a way as to be able to recover the stream of carrier air, having a helical shape at the outlet of the propeller 2*a*, in the axis of the exhaust nozzle 1 before its contact with the droplets 18, this invention can provide that the spraying unit 3 can also comprise a recovery device 14 that extends into the channel for circulation of the stream of carrier air and that can be placed axially between the fan 2 and the spraying element 30 or 31. Preferably, the recovery device 14 can be located close to the fan 2. Thus, owing to such a recovery device 14, it is possible to obtain—downstream from the latter—a stream of cohesive carrier air that is organized in terms of speed and direction essentially in the axis of the exhaust nozzle 1 in a non-laminar way to ensure a better energy yield before it makes contact with the droplets.

Such a recovery device 14 can comprise a number of recovery elements 14*a* such as blades, each blade 14*a* able to extend between two end edges, one of which can be attached to the fuselage 5, i.e., on the outer face of its lateral surface, or wall, 5*a*, and the other can be attached to the exhaust nozzle 1, i.e., on the inner face of the latter. The majority or all of the recovery elements 14 can be made of a single part, for example in a way combined with a part of the exhaust nozzle 1 and a part of the wall of the fuselage 5*a*.

In an advantageous embodiment, as can be seen in particular in FIG. 13, the recovery device 14 can comprise the lateral liquid supply extension 5*d* and/or the lateral electrical supply extension 5*e*. If necessary, as can be seen in this FIG. 13, one of the recovery elements 14*a* can comprise the lateral liquid supply extension 5*d* and/or the lateral electrical supply extension 5*e*.

Furthermore, if reference is made again to FIGS. 1, 2, 3, 4*a*, 4*b*, 5, 8, 10, it is possible to see that the spraying unit 3 can also comprise a diffuser device 15 that extends into the channel for circulation of the stream of carrier air and that the diffuser device 15 can be placed axially between the fan 2 and the rotary atomizer 30, preferably close to the receiving surface 30*a*.

In a preferred embodiment (FIGS. 1, 2, 3, 4*a*, 4*b*, 5, 10), the diffuser device 15 can comprise at least three diffuser elements 15*a*, 15*b*, one of which, so-called central diffuser 15*a*, can consist of a central hollow part with an overall cylindrical or truncated shape surrounding the fuselage 5, while the other diffuser elements, so-called lateral diffusers 15*b*, preferably two other diffuser elements, can each have an aerodynamic wing shape that extends transversely to the axis of said diffuser element 15*a* and can be attached to the outer lateral face of the central diffuser 15*a*, preferably by being distributed in a diametrically opposite way. Such a diffuser device 15 has the effect of organizing—in a way combined with the air outlet opening 1*b* of the exhaust nozzle 1—the mixture of droplets 18 obtained from the rotary atomizer 30, in particular from its receiving surface 30*a* while preserving the characteristics of the stream of cohesive and non-laminar carrier air obtained from the fan 2 and from the recovery device 14, and carrying them in a homogeneous way in the form of a brush in the area of the target (for example, the vegetation).

The attachment and the holding of the diffuser device 15 can be carried out, preferably, by attaching it onto the inner face of the exhaust nozzle 1 (FIGS. 2, 3, 4*a*, 4*b*, 5), for example by means of the diffuser elements 15*b* in wing form.

Such a spraying unit 3 makes it possible to obtain an effective combination of the injection of droplets 18, preferably in a plane or a projection surface that is essentially perpendicular to the longitudinal axis X of the exhaust nozzle 1, in a stream of carrier air with a high and suitable speed. Actually, if the speed of the stream of carrier air is too low, a portion of the droplets 18 is projected onto the inner wall of the exhaust nozzle 1, which generates drainage and a loss of liquid at the target 21, and if the speed of the stream of carrier air is too high, the brush formed by the former at the outlet of the exhaust nozzle 1 is then focused and narrow, which does not make possible a mixture of droplets in the entire air stream at the outlet of the exhaust nozzle 1. In this invention, the droplets 18 are projected into the stream of carrier air in a preferred way inside the exhaust nozzle 1, i.e., in its main space 1*c*, in such a way that their diffusion in the stream of carrier air is not disrupted by the outside atmosphere in contrast to, for example, the system described in the document U.S. Pat. No. 6,152,382.

If reference is made to FIG. 12, it is possible to see that the electronic control and/or monitoring unit 17 can comprise a microprocessor and a memory that can contain codes that are representative of the spraying parameters to be adjusted and/or an identification code Id of said module, as well as a bus for internal communication with the elements of the module (liquid supply system, drive system with electric motor, . . . ).

The microprocessor of the electronic control and/or monitoring unit 17 can be provided for the purpose of determining at least one of the following pieces of monitoring information:

Temperature information and/or current/voltage information and/or speed information pertaining to the operation of the fan drive system 4, 4*a*, Temperature information and/or relative current/voltage information and/or speed information pertaining to the operation of the electric pump 11, If necessary, temperature information and/or relative current/voltage information and/or speed information pertaining to the operation of a rotary atomizer drive system 4', 4'*a*, Information pertaining to the identification code Id of said spraying module.

The microprocessor of the electronic control and/or monitoring unit 17 can also be provided for the purpose of receiving from the electronic central control unit 13 at least one of the following pieces of set-point information:

Set-point information pertaining to the operation of the fan drive system 4, 4a, Set-point information pertaining to the operation of the electric pump 11, If necessary, set-point information pertaining to the operation of the rotary atomizer drive system 4', 4'a.

The spraying module can also comprise a housing 19, adapted to protect the electronic control and/or monitoring unit 17, with said housing able to be placed inside or outside of the inner space 1c of the exhaust nozzle 1 by being integral with the latter or the support 10.

In contrast, the exhaust nozzle 1 can comprise a side wall 1d that extends longitudinally between its air inlet 1a and its air outlet 1b, and the housing 19 can be attached to the outer face of the side wall 1d of the exhaust nozzle 1 or can be integrated in said side wall.

The spraying module can comprise a casing 10 that can protect at least the spraying unit 3, the exhaust nozzle 1 and the electronic control and/or monitoring unit 17. Such a casing can advantageously form at least in part the support 10 for attaching the electric pump 11.

If reference is made in particular to FIGS. 1, 2, 3, 4a, 4b, 5, 8, 10, it is possible to see that the casing 10 can be attached to, for example, the exhaust nozzle 1, for example by ratcheting or encasing. For this purpose, the casing 10 can have an overall cylindrical shape whose open ends each comprise an overall circular or oval inner rib 10a, and the exhaust nozzle 1 can comprise at each of its ends an overall circular or oval groove 1d that is suitable for accommodating—by ratcheting or encasing—one of the inner ribs 10a. The casing 10 can be made of two half-shells.

The accompanying figures, as can be seen in particular in FIG. 12, also show a spraying and control system designed to be installed on board a machine or a movable unit, with said system comprising a number of spraying modules for the spraying of a liquid in droplet form 18 for the treatment of a target such as, for example, a plant row 21, with said liquid coming from a reservoir 26.

In accordance with this invention, such a spraying and control system also comprises a control panel 16 that comprises an electronic central control unit 13 and a man-machine interface 16a, so-called MMI, connected to the latter, with each spraying module consisting of a compact spraying module as defined according to the invention.

Still in accordance with the invention, and as can be seen in FIG. 12, the electronic central control unit 13 is functionally connected to each spraying module in such a way as to allow remote individual control of each spraying module, independently of the other spraying module(s), from the control panel 16 to be able to adjust individually the spraying and operating parameters of each spraying module.

Such a spraying and control system can comprise a central communication bus 25 that makes it possible functionally to connect each spraying module to the control panel 16.

In an embodiment of the communication, not shown, between the control panel 16 and the spraying modules, the control panel 16 can be provided for the purpose of comprising a radiofrequency central communication interface, and the individual communication interface 20 of each spraying module can consist of a radiofrequency communication interface in such a way as to make possible the individual control of each spraying module by radiofrequency means.

Still in referring to FIG. 12, it can be seen that the spraying and control system can also comprise a detection system 24 that is functionally connected to the electronic central control unit 13, if necessary by means of the central communication bus 25 or by radiofrequency, and said detection system can be adapted to detect an absence or a presence of the target and/or a target profile and can transmit to the electronic central control unit 13 a piece of information pertaining to said detection in such a way as to carry out the individual control of each spraying module based on said detected information.

The detection system 24 can comprise:

Presence detection means 24a that make it possible to detect the presence or absence of the target 2 and that can be adapted to transmit to the electronic central control unit 13 a signal that is representative of this detection, with said electronic central control unit being adapted to make possible—based on this detection—the control of at least one of the spraying modules by controlling and monitoring the starting-up, or the halting, of the operation of its own electric pump 11 and its fan drive system 4, 4a, and, if necessary, its rotary atomizer drive system 4', 4'a, and/or Target profile detection means 24b that make it possible to detect a physical magnitude providing information on the profile of the target 21, such as its surface or its density, and that are adapted to transmit to the electronic central control unit 13 a signal that is representative of this information, with said electronic central control unit being adapted to make possible the individual control of each spraying module based on this information by controlling and by monitoring namely the operation of the electric pump 11 to adjust the flow rate of the liquid that supplies the spraying element 30, 31, and the operation of the fan drive system 4, 4a to adjust the speed of the air stream and, if necessary, the operation of the rotary atomizer drive system 4', 4'a to adjust the size of the droplets 18.

In a preferred embodiment of the presence detection means 24a, the former can consist of, for example, one or more detection sensors, for example of the ultrasound, laser or infrared type.

The MMI 16a can comprise a display screen 160a that is provided for the purpose of displaying in a visual manner at least one of the pieces of monitoring information and/or at least one of the pieces of set-point information as defined above, for the purpose of being able to monitor and track over real time the operation of each spraying module directly from the control panel 16. For example, such a display screen makes it possible to display the air speeds and the quantity of liquid sprayed by the spraying modules.

The MMI 16a can also comprise peripherals such as a joystick and/or push buttons that make it possible for the user to carry out various commands, adjustments or checks of the system, for example the adjustment of a manual or automatic mode of the system, the adjustment of the flow rate of liquid to be sprayed from some spray module or other that is selected or else the adjustment of the width of the row by selecting—based on this width—the number of spray modules to be started up.

The spraying and control system according to this invention can also comprise a calibration device of the electric pump 11 of each module that makes it possible to apply a correction factor on the electric pump 11 in question directly from the control panel 16 in such a way as to ensure the necessary precision of the flow rate of sprayed liquid.

Thus, in such a spraying and control system, the control panel 16, and more particularly its electronic central control unit 13, can be considered as being the master part of the system, and the electronic control and monitoring units 17 of the spraying modules can be considered as being the slave parts of the system making it possible to control and monitor the power elements of the modules.

Such a system makes it possible to reduce to the maximum the quantity of product (the liquid) applied on the target 21, such as a vine, and it makes it possible, for example, to provide the following functionalities and advantages:

Adjustment of the flow rate and the row width on the control panel 16 for the purpose of modifying automatically the flow rate, for example from the cabin of the movable unit 23, eliminating the contact between the user and the phytosanitary product (liquid), Variations of the flow rate of the electric pump 11 proportionally to the speed of advance of the movable unit 23, Adjustment of the flow rate/air speed on each spraying module so as to optimize the application of the liquid on the target 21, such as, for example, in the case where the target 21 is a vine, to put more product (liquid in the form of droplets) in the fruit-bearing zone, or, for example, to halt the operation of the spraying modules that are not necessary at the beginning of treatment, Detection of the target so as to trigger and to halt the spraying when the system detects the target 21 (for example, vegetation) at the beginning of the row or no longer detects the target 21 at the end of the row, Making it possible for the user to correlate the information displayed on the control panel 16 with the quantity of liquid (pulp) prepared at the beginning of treatment so as to verify that the proper quantity of product has been applied to the target, Monitoring and tracking in real time the spraying system making it possible to know, for example, the electrical consumption of each spraying module, the speed of rotation of each electric pump 11, the verification in real time of the communication between the control panel 16 and the spraying modules, Making it possible to diagnose the system from the control panel 16 and therefore, for example, from the cabin of the movable unit 23 where said panel is found, as well as the operation before and during the treatment so as to immediately decelerate any malfunction that can affect the quality of treatment, Simplifying the calibration of the electric pumps 11 of each module, in such a way as to make it possible that each electric pump 11 is adjusted as precisely as possible by applying a correction factor to the electric pump 11 directly from the control panel 16.

This invention also has as its object a method for controlling a number of spraying modules of a spraying and control system for the spraying of a liquid in droplet form for the treatment of a target 21, such as, for example, a plant row, with said liquid coming from a reservoir 26, said spraying and control system being defined according to this invention.

In accordance with this invention, such a method consists in controlling individually each spraying module, independently of the other spraying modules, from the control panel 16 of the spraying and control system to adjust and/or monitor individually the operating and spraying parameters of each spraying module.

In a preferred embodiment of the method, the former can consist in individually controlling, from the control panel 16, each spraying module based on the presence or the absence of the target and/or based on the target profile detected from the detection system 24. More particularly, the method can consist in carrying out, from the control panel 16, the individual control of each spraying module by controlling and monitoring:

Following the detection of the presence, or the absence, of the target, owing to the presence detection means 24*a* of said detection system 24, the starting-up, or the halting, of the operation of the electric pump 11 and the fan drive system 4, 4*a*, and, if necessary, the rotary atomizer drive system 4', 4'*a*, or Following the detection of the physical magnitude providing information on the profile of the target 21, such as its surface or its density, based on said information, with the operation of the electric pump 11 for adjusting the flow rate of the liquid supplying the spraying element 30 or 31 and the operation of the fan drive system 4, 4*a* for adjusting the speed of the air stream, and, if necessary, the operation of the rotary atomizer 30 to adjust the size of the droplets 18.

Of course, the invention is not limited to the methods or embodiments described and shown in the accompanying drawings. Modifications are possible, in particular from the standpoint of the composition of the various elements or by substitution of equivalent techniques, without thereby exceeding the scope of protection of the invention.

The invention claimed is:

1. A spraying and control system for the spraying of a liquid in droplet form for the treatment of a target, said spraying and control system comprising:

a plurality of independent compact spraying modules;

a separate common reservoir located separate from each compact spraying module;

a piping for supply of liquid between said common reservoir and each of said independent compact spraying modules; and a control panel that remotely individually controls each compact spraying module, independently of the other compact spraying modules, wherein each of said compact spraying modules has:

a spraying unit with an exhaust nozzle with an air inlet opening at one of its ends and an air outlet opening at its other end, with said exhaust nozzle surrounding, along its axis, an inner space that contains at least one spraying element creating and propelling droplets in the inner space, a fan that can axially generate—in the inner space of the exhaust nozzle—a stream of carrier air around said spraying element to carry toward the target the droplets that are created and propelled in said stream of carrier air in the inner space, and a fan drive system for driving said fan, wherein each of said compact spraying modules further has:

a separate liquid supply system that is functionally connected to the piping said liquid supply system including an electric pump, combined with a flow rate sensor, that pushes back, at a controlled variable flow rate, the liquid that comes from said common reservoir, in said piping, and a connecting interface that is provided to receive the liquid that comes from the reservoir of the spraying and control system, and a support that keeps the electric pump steady, in proximity to the spraying unit, an electronic control and/or monitoring unit, on an electronic card, provided for the purpose of controlling and/or monitoring the operation of the fan drive system and the liquid supply system by being functionally connected to said drive system and liquid supply system, an individual communication interface for functionally connecting the compact spraying module, directly or indirectly, to the control panel, and an energy supply interface that can be connected functionally to an electrical energy source to supply energy to said compact spraying module, such that said control panel can independently control each of said compact modules separately, allowing for independent adjustment of the amount of treatment sprayed on said target.

2. The spraying and control system, according to claim 1, wherein the spraying element includes a rotary atomizer that is mounted in rotation around an axis of rotation and further comprising a rotary atomizer drive system with an electric motor provided for the purpose of being able to transmit torque and rotation to the rotary atomizer, with said rotary atomizer being able, under the action of its rotation, to break up—by centrifuging—the liquid into droplets and to propel them into the stream of carrier air, in a plane that is essentially perpendicular to the axis of the exhaust nozzle.

3. The spraying and control system according to claim 2, wherein the rotary atomizer drive system comprises an electric motor, functionally connected to the electronic control and/or monitoring unit, and a drive shaft that can be driven in rotation around its axis of rotation by said electric motor and can transmit the torque and the rotation to the rotary atomizer.

4. The spraying and control system, according to claim 2, wherein the fan drive system and the rotary atomizer drive system form a single fan and rotary atomizer drive system that is common to both the fan and the rotary atomizer, and wherein said common fan and rotary atomizer drive system comprises a single common electric motor, functionally connected to the electronic control and/or monitoring unit and a single common drive shaft that is able to be driven in rotation around its axis by said common electric motor and is able to transmit the torque and the rotation to both the fan and the rotary atomizer.

5. The spraying and control system, according to claim 1, wherein the electronic control and/or monitoring unit comprises a microprocessor, a memory that contains codes that are representative of a plurality of spraying parameters to be adjusted and/or an identification code of said module, as well as an internal communication bus.

6. The spraying and control system, according to claim 5, wherein the microprocessor is provided for the purpose of determining at least one of the following pieces of monitoring information:

Temperature information and/or current/voltage information and/or speed information pertaining to the operation of the fan drive system;

Temperature information and/or relative current/voltage information and/or speed information pertaining to the operation of the electric pump;

Temperature information and/or relative current/voltage information and/or speed information pertaining to the operation of a rotary atomizer drive system, Information pertaining to the identification code of said spraying module.

7. The spraying and control system, according to claim 5, wherein the microprocessor is provided for the purpose of receiving from the electronic central control unit at least one of the following pieces of set-point information:

Set-point information pertaining to the operation of the fan drive system;

Set-point information pertaining to the operation of the electric pump;

Set-point information pertaining to the operation of a rotary atomizer drive system.

8. The spraying and control system, according to claim 1, further comprising a housing, adapted to protect the electronic control and/or monitoring unit, with said housing being placed outside of the inner space of the exhaust nozzle by being integral with exhaust nozzle or the support.

9. The spraying and control system, according to claim 8, wherein the exhaust nozzle comprises a side wall that extends longitudinally between its air inlet and its air outlet, and wherein the housing is attached to an outer face of the side wall of the exhaust nozzle or is integrated in said side wall.

10. The spraying and control system, according to claim 1, further comprising a casing that can protect at least the spraying unit, the exhaust nozzle and the electronic control and/or monitoring unit, with said casing at least in part forming the support for attaching the electric pump.

11. The spraying and control system, according to claim 1, wherein the fan drive system comprises an electric motor, functionally connected to the electronic control and/or monitoring unit, and a drive shaft that can be driven in rotation around its axis by said electric motor and can transmit the torque and the rotation to the fan.

12. A spraying and control system as claimed in claim 1, designed to be installed on board a machine or a movable unit, with said system comprising:

said plurality of independent compact spraying modules for the spraying of a liquid in the form of droplets for the treatment of a target, with said liquid coming from said common reservoir separate from said plurality of compact spraying modules, said spraying and control system further comprising said control panel having an electronic central control unit and a man-machine interface, connected to the electronic central control unit, wherein the electronic central control unit is functionally connected to each said separate compact spraying module to remotely individually control each said spraying module, independently of the other said spraying module(s), from said control panel to adjust individually the spraying and operating parameters of each said spraying module.

13. The spraying and control system, according to claim 12, further comprising a central communication bus that functionally connects each spraying module to the control panel.

14. The spraying and control system, according to claim 12, wherein the control panel comprises a radiofrequency central communication interface and wherein the individual communication interface of each module is a radiofrequency communication interface that individually controls each spraying module by radiofrequency means.

15. The spraying and control system, according to claim 12, further comprising a detection system functionally connected to the electronic central control unit, by means of the central communication bus or by radiofrequency, and wherein said detection system is adapted to detect an absence or a presence of the target and/or a target profile and to transmit to the electronic central control unit information pertaining to said detection in such a way as to carry out the individual control of each spraying module based on said detected information.

16. The spraying and control system, according to claim 15, wherein the detection system comprises: Presence detection means that detects the presence or absence of the target and that are adapted to transmit to the electronic central control unit a signal that is representative of this detection, with said electronic central control unit adapted to—based on this detection—control of at least one of the spraying modules by controlling and monitoring the starting-up, or the halting, of the operation of the respective electric pump and fan drive system, and, a rotary atomizer drive system, And/or target profile detector that detects a physical magnitude providing information on the profile of the target, such as its surface or its density, and being adapted to transmit to the electronic central control unit a signal that is representative of this information, with said electronic central control unit adapted to individually control of each spraying module based on this information by controlling and by monitoring namely the operation of the respective electric pump to adjust the flow rate of the liquid that supplies the spraying element, and the operation of the respective fan drive system to adjust the speed of the air stream and, the operation of the rotary atomizer drive system to adjust the size of the droplets.

17. The spraying and control system, according to claim 16, wherein the presence detection means includes one or more detection sensors of the ultrasound, laser, or infrared type.

18. The spraying and control system, according to claim 12, wherein the man-machine interface comprises a display screen that is provided for the purpose of displaying in a visual manner at least one piece of monitoring information selected from a list including:

temperature information and/or current/voltage information and/or speed information pertaining to the operation of the fan drive system;

temperature information and/or relative current/voltage information and/or speed information pertaining to the operation of the electric pump;

temperature information and/or relative current/voltage information and/or speed information pertaining to the operation of a rotary atomizer drive system, and information pertaining to an identification code of said spraying module, for the purpose of being able to monitor and track over real time the operation of each spraying module directly from the control panel.

19. The spraying and control system, according to claim 12, further comprising a calibration device of the electric pump of each module that applies a correction factor on the electric pump in question directly from the control panel.

20. A method for controlling a number of spraying modules of a spraying and control system for the spraying of a liquid in the form of droplets for the treatment of a target, with said liquid coming from a reservoir, said spraying and control system being defined according to claim 12, further comprising controlling individually each spraying module, independently of the other spraying modules, from the control panel functionally connected to each spraying module to adjust and/or monitor individually operating and spraying parameters of each spraying module.

21. The control method according to claim 20, further comprising controlling individually, from the control panel, each spraying module based on the presence or the absence of the target and/or based on a target profile detected starting from a detection system, which further comprises a detection system functionally connected to the electronic central control unit, by means of a central communication bus or by radiofrequency, and wherein said detection system is adapted to detect an absence or a presence of the target and/or a target profile and to transmit to the electronic central control unit information pertaining to said detection in such a way as to carry out the individual control of each spraying module based on said detected information.

22. The control method according to claim 21, the detection system comprising: presence detection means that detects the presence or absence of the target and that are adapted to transmit to the electronic central control unit a signal that is representative of this detection, with said electronic central control unit being adapted to—based on this detection—control of at least one of the spraying modules by controlling and monitoring the starting-up, or the halting, of the operation of the respective electric pump and fan drive system, and, a rotary atomizer drive system, and/or target profile detector that detects a physical magnitude providing information on the profile of the target, such as its surface or its density, and being adapted to transmit to the electronic central control unit a signal that is representative of this information, with said electronic central control unit adapted to individually control each spraying module based on this information by controlling and by monitoring namely the operation of the electric pump to adjust the flow rate of the liquid that supplies the spraying element, and the operation of the fan drive system to adjust the speed of the air stream and, the operation of the rotary atomizer drive system to adjust the size of the droplets; the control method comprising carrying out, starting from the control panel, the individual control of each spraying module by controlling and by monitoring: Following the detection of the presence, or the absence, of the target, owing to the presence detection means of said detection system, the starting-up, or the halting, of the operation of the electric pump and the fan drive system, and, the rotary atomizer drive system with an electric motor provided for the purpose of being able to transmit torque and rotation to a rotary atomizer, with the rotary atomizer being able, under the action of its rotation, to break up—by centrifuging—the liquid into droplets and to propel them into the stream of carrier air, or Following the detection of the physical magnitude providing information on the profile of the target, such as its surface or its density, based on said information, with the operation of a respective electric pump for adjusting the flow rate of the liquid supplying the spraying element and the operation of a respective fan drive system for adjusting the speed of the air stream, and, optionally, the operation of the rotary atomizer to adjust the size of the droplets.

* * * * *